United States Patent
Takashima et al.

(10) Patent No.: US 9,881,740 B2
(45) Date of Patent: *Jan. 30, 2018

(54) MONOLITHIC CERAMIC CAPACITOR WITH VARYING CONDUCTOR DENSITY

(71) Applicant: Murata Manufacturing Co., Ltd., Nagaokakyo-shi, Kyoto-fu (JP)

(72) Inventors: Hirokazu Takashima, Nagaokakyo (JP); Satoki Sakai, Nagaokakyo (JP)

(73) Assignee: MURATA MANUFACTURING CO., LTD., Kyoto (JP)

(*) Notice: Subject to any disclaimer, the term of this patent is extended or adjusted under 35 U.S.C. 154(b) by 0 days.

This patent is subject to a terminal disclaimer.

(21) Appl. No.: 15/375,322

(22) Filed: Dec. 12, 2016

(65) Prior Publication Data

US 2017/0092425 A1    Mar. 30, 2017

Related U.S. Application Data

(63) Continuation of application No. 14/516,730, filed on Oct. 17, 2014, now Pat. No. 9,640,322.

(30) Foreign Application Priority Data

Oct. 29, 2013 (JP) .................... 2013-224114
Jul. 30, 2014 (JP) .................... 2014-154901

(51) Int. Cl.
*H01G 4/12* (2006.01)
*H01G 4/30* (2006.01)
(Continued)

(52) U.S. Cl.
CPC .............. *H01G 4/12* (2013.01); *H01G 4/012* (2013.01); *H01G 4/232* (2013.01); *H01G 4/30* (2013.01)

(58) Field of Classification Search
CPC ........... H01G 4/12; H01G 4/232; H01G 4/012
See application file for complete search history.

(56) References Cited

U.S. PATENT DOCUMENTS

| 9,640,322 B2 * | 5/2017 | Takashima | ............ H01G 4/012 |
| 2008/0081200 A1 * | 4/2008 | Katsube | ............... H01G 4/2325 428/457 |

(Continued)

FOREIGN PATENT DOCUMENTS

| JP | 08298227 A | * | 11/1996 |
| JP | 11026295 A | * | 1/1999 |

(Continued)

OTHER PUBLICATIONS

Takashima et al., "Monolithic Ceramic Capacitor with Internal Conductor Layers Having Different Densities", U.S. Appl. No. 14/516,730, filed Oct. 17, 2014.

*Primary Examiner* — David M Sinclair
(74) *Attorney, Agent, or Firm* — Keating & Bennett, LLP

(57) ABSTRACT

A monolithic ceramic capacitor includes an element body having therein a multilayer portion formed of a plurality of conductor layers and a plurality of ceramic dielectric layers alternately stacked in a thickness direction; and a first outer electrode and a second outer electrode provided on an outer portion of the element body. The element body is divided in the thickness direction into a thickness-direction first outer layer portion, a thickness-direction second outer layer portion, and a thickness-direction inner layer portion located between the thickness-direction first outer layer portion and the thickness-direction second outer layer portion and including the multilayer portion. A first conductor layer and a second conductor layer, which are outermost layers among the plurality of conductor layers, have lower conductor densities than any of conductor densities of the other conductor layers.

15 Claims, 13 Drawing Sheets

(51) Int. Cl.
*H01G 4/012* (2006.01)
*H01G 4/232* (2006.01)

(56) References Cited

U.S. PATENT DOCUMENTS

| | | | | |
|---|---|---|---|---|
| 2008/0212257 A1* | 9/2008 | Sakamoto | ............... | H01G 4/008 |
| | | | | 361/305 |
| 2010/0271751 A1* | 10/2010 | Sasabayashi | .......... | H01G 4/012 |
| | | | | 361/301.4 |
| 2011/0157766 A1* | 6/2011 | Cho | ....................... | H01G 4/005 |
| | | | | 361/303 |
| 2012/0127626 A1* | 5/2012 | Chang | .................... | H01G 4/012 |
| | | | | 361/301.4 |

FOREIGN PATENT DOCUMENTS

| JP | 2007158267 A | * | 6/2007 |
|---|---|---|---|
| JP | 2007335726 A | * | 12/2007 |

* cited by examiner

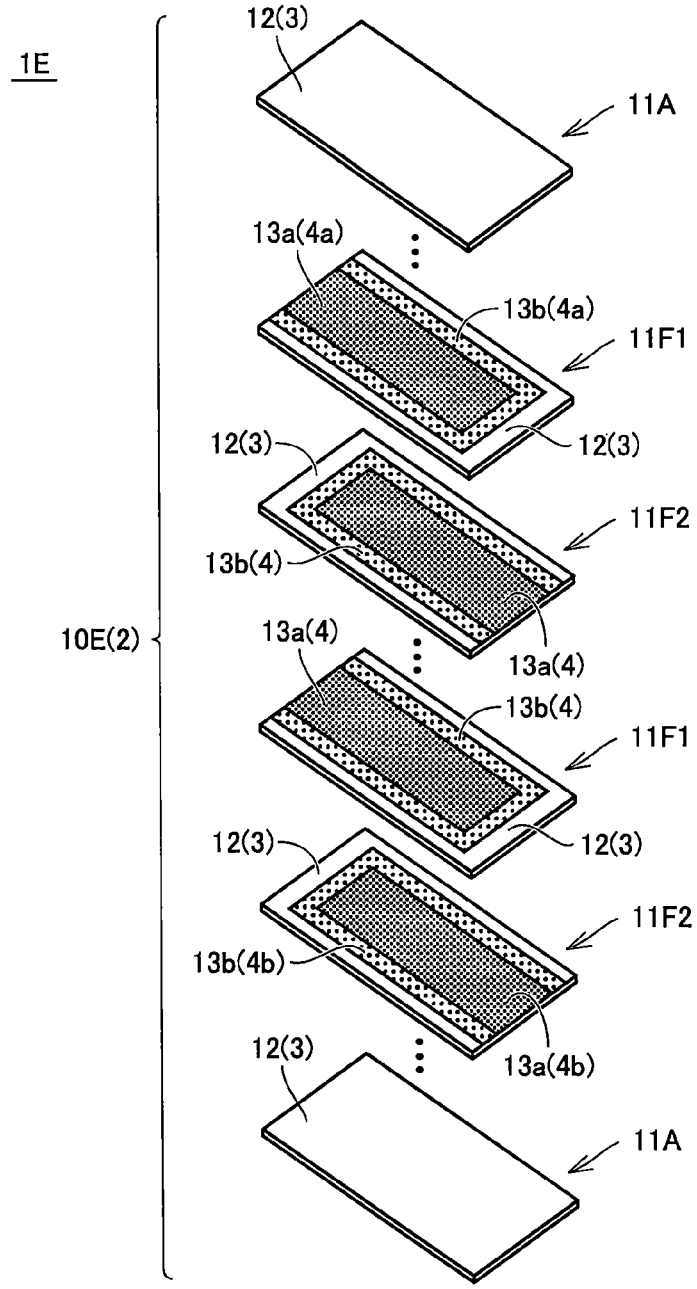

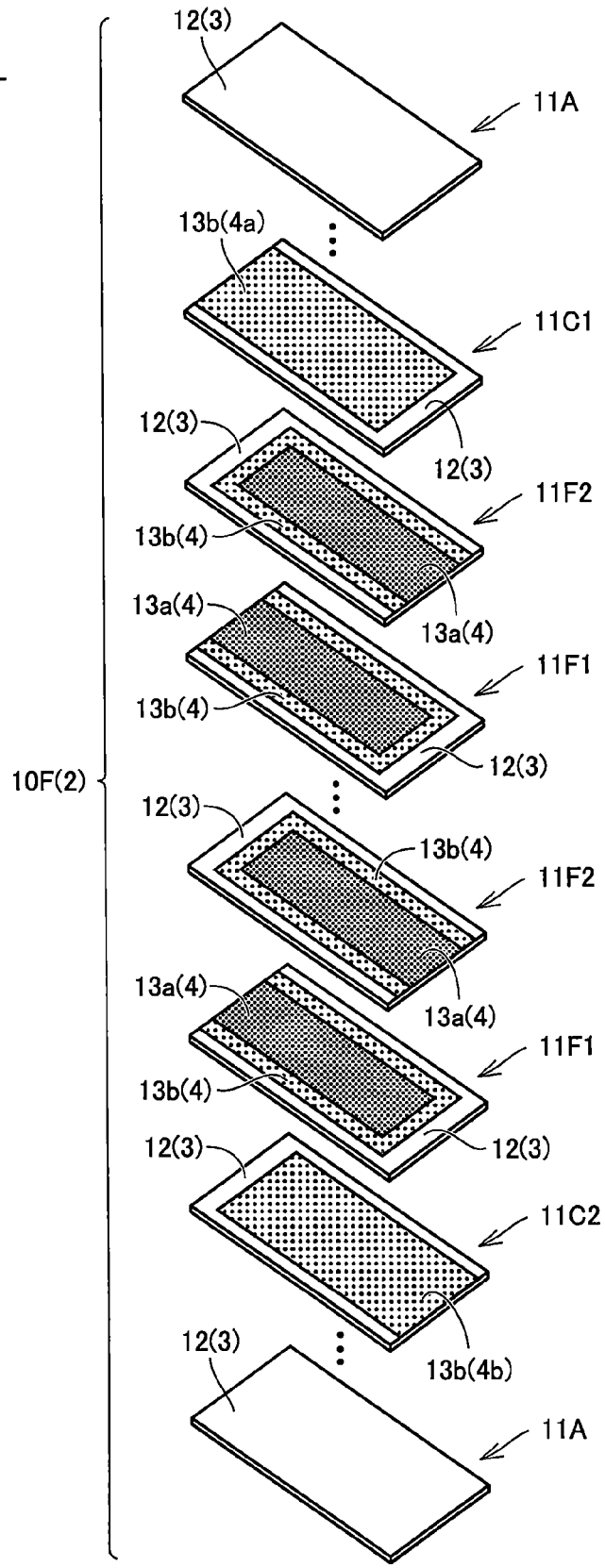

MONOLITHIC CERAMIC CAPACITOR WITH VARYING CONDUCTOR DENSITY

BACKGROUND OF THE INVENTION

1. Field of the Invention

The present invention relates to a monolithic ceramic capacitor, which is a type of capacitor element, and which includes a dielectric layer made of a ceramic dielectric material.

2. Description of the Related Art

A capacitor element generally includes an element body, in which conductor layers and dielectric layers are alternately stacked, and an outer electrode provided on an outer surface of the element body. A monolithic ceramic capacitor is a type of capacitor element, in which the dielectric layers are made of a ceramic dielectric material.

The monolithic ceramic capacitor typically includes therein a substantially rectangular-parallelepiped-shaped multilayer portion, in which a plurality of conductor layers defining inner electrode layers and a plurality of ceramic dielectric layers are alternately densely stacked. The multilayer portion is covered with an outer layer portion made of ceramic dielectric layers, and an outer layer portion, in which a relatively small number of conductor layers defining a wiring portion are included in the ceramic dielectric layers. Thus, the above-described element body is formed.

To increase the capacity of the monolithic ceramic capacitor, it is required to increase the facing area between adjacent conductor layers included in the multilayer portion. To increase the facing area, it is effective to increase the density of the conductor material of the portion in which the conductor layers are arranged, that is, the conductor density (also called inner electrode density). Accordingly, continuity of the conductor layers is increased, the above-described facing area is increased, and the capacity of the monolithic ceramic capacitor is increased.

For example, Japanese Unexamined Patent Application Publication No. 2013-12418 discloses a monolithic ceramic capacitor with an increased continuity of the conductor layers.

However, when the continuity of the conductor layers is increased, delamination is likely to occur. The delamination is a separation phenomenon occurring because of a large difference between contraction of the conductor layer and contraction of the ceramic dielectric layer. When thermal history is added, the thermal history acts as a shear force at a boundary portion between the ceramic dielectric layer and the conductor layer.

In particular, the delamination more likely occurs between the multilayer portion, in which the conductor layers and the ceramic dielectric layers are densely stacked, and the above-described outer layer portions. The delamination may cause a decrease in reliability of the product and a decrease in yield in a manufacturing process.

SUMMARY OF THE PRESENT INVENTION

Accordingly, preferred embodiments of the present invention address the above-described problems and provide a large-capacity monolithic ceramic capacitor in which the occurrence of delamination is significantly reduced or prevented.

According to a preferred embodiment of the present invention, a monolithic ceramic capacitor includes an element body including therein a multilayer portion including a plurality of conductor layers and a plurality of ceramic dielectric layers alternately stacked in a thickness direction, and an outer electrode provided on an outer portion of the element body. Outer surfaces of the element body include a first principal surface and a second principal surface opposed in the thickness direction, a first end surface and a second end surface opposed in a length direction perpendicular or substantially perpendicular to the thickness direction, and a first side surface and a second side surface opposed in a width direction perpendicular or substantially perpendicular to both the thickness direction and the length direction. The element body is divided in the thickness direction into a thickness-direction first outer layer portion that includes a first ceramic dielectric layer and defines the first principal surface, a thickness-direction second outer layer portion that includes a second ceramic dielectric layer and defines the second principal surface, and a thickness-direction inner layer portion including the multilayer portion and located between the thickness-direction first outer layer portion and the thickness-direction second outer layer portion. Among the plurality of conductor layers included in the thickness-direction inner layer portion, a first conductor layer arranged at a position closest to the first principal surface is provided at a position adjacent to the first ceramic dielectric layer of the thickness-direction first outer layer portion. Among the plurality of conductor layers included in the thickness-direction inner layer portion, a second conductor layer arranged at a position closest to the second principal surface is provided at a position adjacent to the second ceramic dielectric layer of the thickness-direction second outer layer portion. A conductor density of the first conductor layer and a conductor density of the second conductor layer are lower than any of conductor densities of the other conductor layers located between the first conductor layer and the second conductor layer.

In the monolithic ceramic capacitor according to the above-described preferred embodiment of the present invention, the first conductor layer and the second conductor layer may include a plurality of fine through holes penetrating through the first conductor layer and the second conductor layer in the thickness direction. In this case, the plurality of through holes may preferably be filled with a ceramic dielectric material.

In the monolithic ceramic capacitor according to the above-described preferred embodiments of the present invention, the outer electrode may include a first outer electrode provided to cover the first end surface, and a second outer electrode provided to cover the second end surface. In this case, one portion of the plurality of conductor layers may preferably be connected with the first outer electrode through a first wiring portion extending from the multilayer portion toward the first end surface side, and another portion of the plurality of conductor layers may be preferably connected with the second outer electrode through a second wiring portion extending from the multilayer portion toward the second end surface side.

In the monolithic ceramic capacitor according to the above-described preferred embodiments of the present invention, the element body may be divided in the length direction into a length-direction first outer layer portion that includes portions of the conductor layer and the ceramic dielectric layer corresponding to the first wiring portion and defines the first end surface, a length-direction second outer layer portion that includes portions of the conductor layer and the ceramic dielectric layer corresponding to the second wiring portion and defines the second end surface, and a length-direction inner layer portion that includes the multilayer portion and is located between the length-direction first outer layer portion and the length-direction second outer layer portion. In this case, a conductor density in a length-direction first end portion region located at the first end surface side in the multilayer portion, and a conductor density in a length-direction second end portion region located at the second end surface side in the multilayer portion may preferably be lower than a conductor density in a length-direction center portion region located at the center in the length direction in the multilayer portion.

In the monolithic ceramic capacitor according to the above-described preferred embodiments of the present invention, a portion of the conductor layer connected with the second outer electrode and included in the length-direction first end portion region among the plurality of conductor layers, and a portion of the conductor layer connected with the first outer electrode and included in the length-direction second end portion region among the plurality of conductor layers may include a plurality of fine through holes penetrating through the portions of the conductor layers in the thickness direction. In this case, the plurality of through holes may preferably be filled with the ceramic dielectric material.

In the monolithic ceramic capacitor according to the above-described preferred embodiments of the present invention, the element body may be divided in the width direction into a width-direction first outer layer portion that includes the ceramic dielectric layer and defines the first side surface, a width-direction second outer layer portion that includes the ceramic dielectric layer and defines the second side surface, and a width-direction inner layer portion that includes the multilayer portion and is located between the width-direction first outer layer portion and the width-direction second outer layer portion. In this case, a conductor density in a width-direction first end portion region located at the first side surface side in the multilayer portion, and a conductor density in a width-direction second end portion region located at the second side surface side in the multilayer portion may preferably be lower than a conductor density in a width-direction center portion region located at the center in the width direction in the multilayer portion.

In the monolithic ceramic capacitor according to the above-described preferred embodiments of the present invention, portions included in the width-direction first end portion region and the width-direction second end portion region among the plurality of conductor layers may include a plurality of fine through holes penetrating through the conductor layers in the thickness direction. In this case, the plurality of through holes may preferably be filled with the ceramic dielectric material.

In the monolithic ceramic capacitor according to the above-described preferred embodiments of the present invention, the first conductor layer and the second conductor layer may be floating conductor layers not connected to the outer electrode.

With various preferred embodiments of the present invention, large-capacity monolithic ceramic capacitors that significantly reduces or prevents the occurrence of delamination are provided.

The above and other elements, features, steps, characteristics and advantages of the present invention will become more apparent from the following detailed description of the preferred embodiments with reference to the attached drawings.

BRIEF DESCRIPTION OF THE DRAWINGS

FIG. 16 is an exploded view showing a multilayer structure of an element body included in a monolithic ceramic capacitor according to a fourth preferred embodiment of the present invention.

FIG. 17 is an exploded view showing a multilayer structure of an element body included in a monolithic ceramic capacitor according to a fifth preferred embodiment of the present invention.

DETAILED DESCRIPTION OF THE PREFERRED EMBODIMENTS

Figure 1:
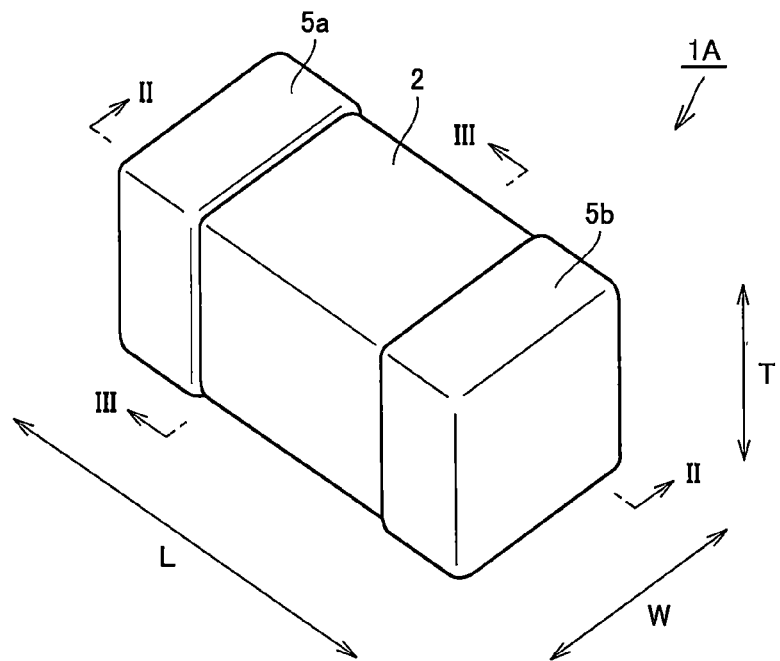
FIG. 1 is a brief perspective view of a monolithic ceramic capacitor according to a first preferred embodiment of the present invention.

Preferred embodiments of the present invention will be described below in detail with reference to the drawings. In the following preferred embodiments, the same reference sign is applied to the same or common portion in the drawings, and the description is not repeated.

First Preferred Embodiment

Figure 2:
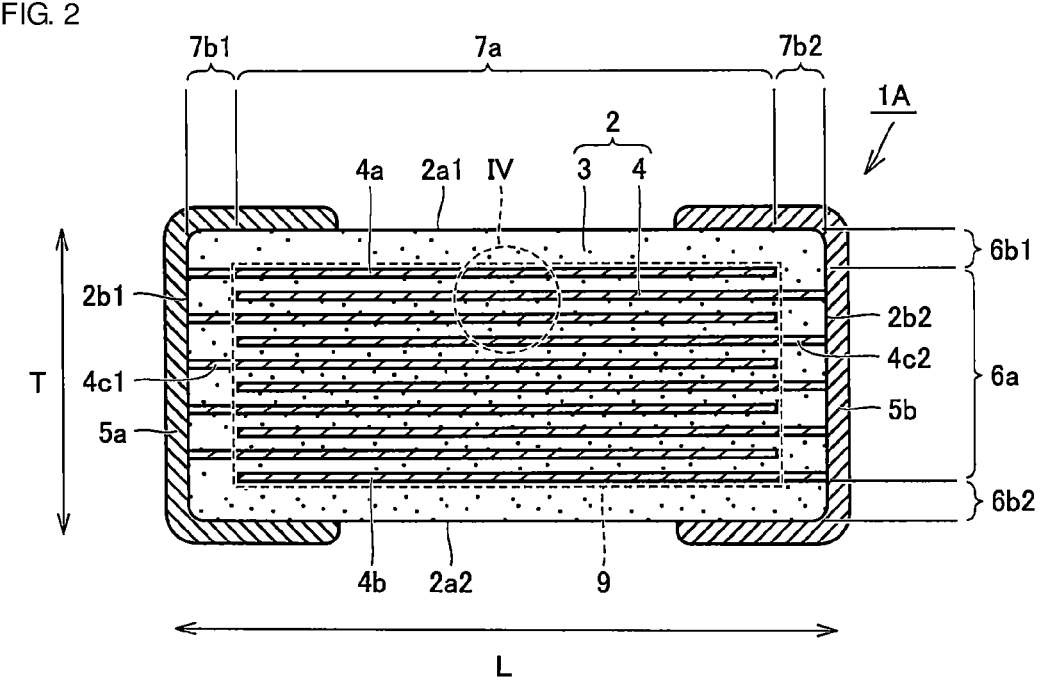
FIG. 2 is a schematic cross-sectional view taken along line II-II in FIG. 1.
Figure 3:
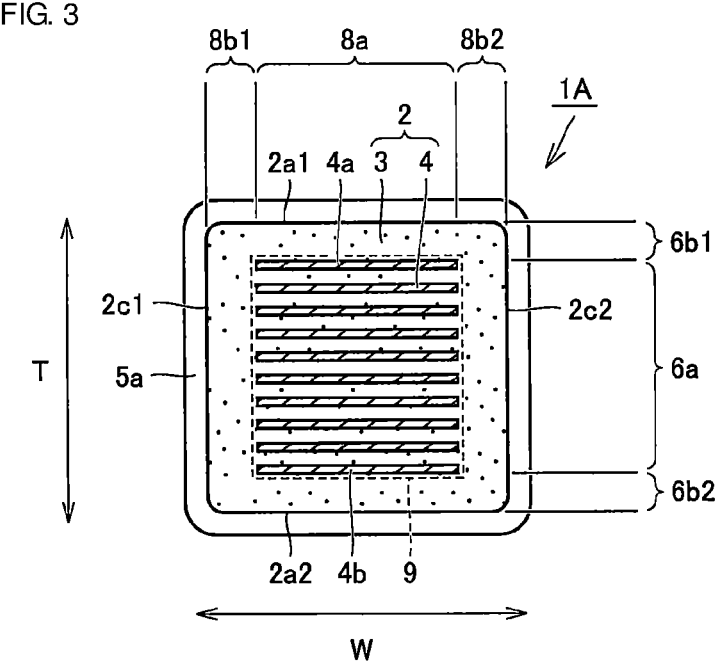
FIG. 3 is a schematic cross-sectional view taken along line III-III in FIG. 1.
Figure 4:
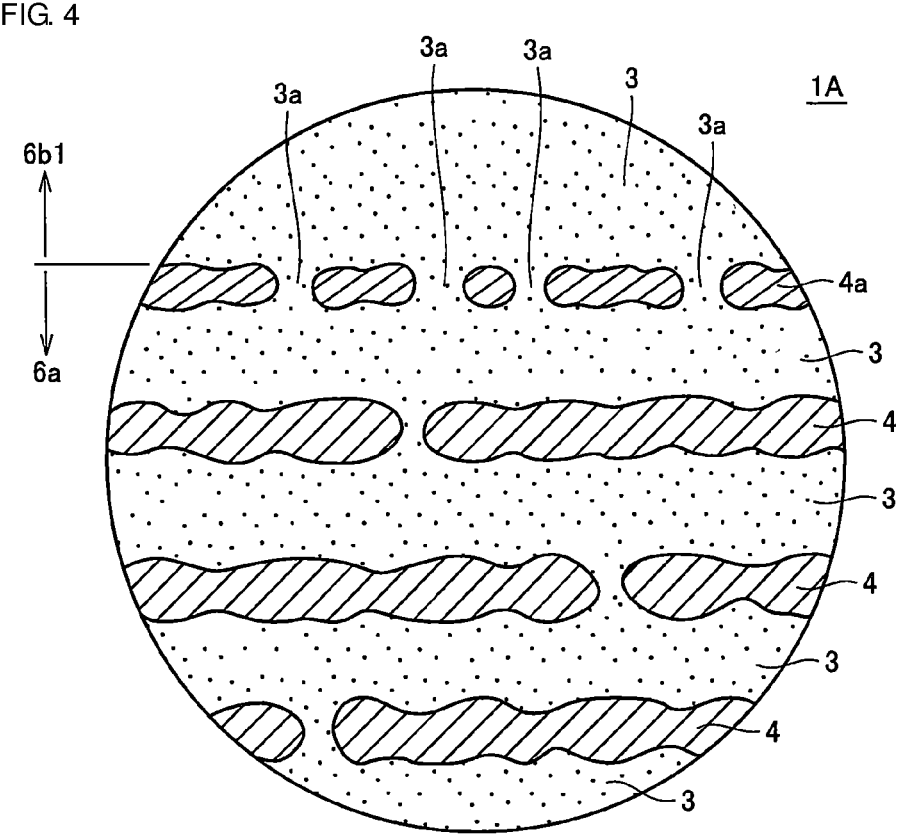
FIG. 4 is an enlarged view of region IV in FIG. 2.

FIG. 1 is a schematic perspective view of a monolithic ceramic capacitor according to a first preferred embodiment of the present invention. Also, FIGS. 2 and 3 are schematic cross-sectional views taken along line II-II and line III-III in FIG. 1. FIG. 4 is an enlarged view of region IV in FIG. 2. A configuration of a monolithic ceramic capacitor 1A according to this preferred embodiment is described with reference to FIGS. 1 to 4.

As shown in FIGS. 1 to 3, the monolithic ceramic capacitor 1A is an electronic component having a rectangular or substantially rectangular parallelepiped shape, and includes an element body 2, and a first outer electrode 5a and a second outer electrode 5b defining a pair of outer electrodes.

As shown in FIGS. 2 and 3, the element body 2 has a rectangular or substantially rectangular parallelepiped shape, and includes ceramic dielectric layers 3 and inner electrode layers 4 defining and serving as conductor layers alternately stacked in a predetermined direction. The ceramic dielectric layers 3 are preferably made of a ceramic dielectric material including, for example, barium titanate as the main constituent. Also, the ceramic dielectric layers 3 may include a Mn compound, a Mg compound, a Si compound, a Co compound, a Ni compound, a rare-earth compound, and other suitable compounds, as a sub-constituent of ceramic powder serving as a raw material of a ceramic green sheet (described later); and Al, Si, etc., as a sintering aid. In contrast, the inner electrode layers 4 are preferably made of a base metal material, such as Ni or Cu, for example.

The element body 2 is preferably manufactured by preparing a plurality of raw-material sheets, each of which is formed by printing a conductive pattern that becomes the inner electrode layer 4 on a surface of a ceramic green sheet that becomes the ceramic dielectric layer 3; manufacturing a mother block by stacking and press-bonding the plurality of raw-material sheets; individualizing the mother block into a plurality of multilayer chips by dividing the mother block; and then firing the multilayer chips.

The material of the ceramic dielectric layers 3 is not limited to the ceramic dielectric material containing the above-described barium titanate as the main constituent, and other ceramic dielectric material with a high dielectric constant, for example, a material containing $CaZrO_3$, $CaTiO_3$, $SrTiO_3$, or other suitable material as the main constituent, may be used as the material. Also, the material of the inner electrode layers 4 is not limited to the above-described base metal material, and other conductor material may be used as the material of the inner electrode layers 4.

As shown in FIGS. 1 and 2, the first outer electrode 5a and the second outer electrode 5b are separated from each other so as to cover the outer surfaces located at both end portions in the predetermined direction of the element body 2. The first outer electrode 5a and the second outer electrode 5b are made of conductive films.

The first outer electrode 5a and the second outer electrode 5b are preferably made of multilayer films each including, for example, a sintered metal layer and a plated layer. For example, the sintered metal layer is preferably formed by sintering conductor paste, such as Cu, Ni, Ag, Pd, an Ag—Pd alloy, or Au, or conductive resin paste containing metal powder made of any of these materials. For example, the plated layer preferably includes a Ni plated layer and a Sn plated layer covering the Ni plated layer. Alternatively, the plated layer may be a Cu plated layer or an Au plated layer. Also, the first outer electrode 5a and the second outer electrode 5b may include only the plated films.

As shown in FIG. 2, one of a pair of the adjacent inner electrode layers 4 with the ceramic dielectric layer 3 interposed therebetween in a stack direction is connected with the first outer electrode 5a through a first wiring portion 4c1 in the monolithic ceramic capacitor 1A. The other of the pair of adjacent inner electrode layers 4 with the ceramic dielectric layer 3 interposed therebetween in the stack direction is connected with the second outer electrode 5b through a second wiring portion 4c2 in the monolithic ceramic capacitor 1A. Accordingly, a plurality of capacitor elements are electrically connected in parallel between the first outer electrode 5a and the second outer electrode 5b.

As shown in FIGS. 2 and 3, in the monolithic ceramic capacitor 1A according to this preferred embodiment, a portion of the above-described plurality of inner electrode layers 4 excluding the first wiring portion 4c1 and the second wiring portion 4c2 is an area that determines the capacity of the monolithic ceramic capacitor 1A (so-called effective region). A portion including the portion of the plurality of inner electrode layers 4 that determines the capacity and the ceramic dielectric layers 3 interposed among the inner electrode layers 4 defines a multilayer portion 9, in which the ceramic dielectric layers 3 and the inner electrode layers 4 are densely stacked in a thickness direction.

With reference to FIGS. 1 to 3, for terms expressing the directions of the monolithic ceramic capacitor 1A, the direction in which the ceramic dielectric layers 3 and the inner electrode layers 4 are stacked is defined as a thickness direction T, the direction in which the first outer electrode 5a and the second outer electrode 5b are arranged is defined as a length direction L, and the direction perpendicular or substantially perpendicular to both the thickness direction T and the length direction L is defined as a width direction W. These terms are used in the following description.

Also, with reference to FIGS. 2 and 3, among the six outer surfaces of the rectangular or substantially rectangular-parallelepiped-shaped element body 2, a pair of opposite outer surfaces arranged in the thickness direction T are respectively defined as a first principal surface 2a1 and a second principal surface 2a2, a pair of opposite outer surfaces arranged in the length direction L are respectively defined as a first end surface 2b1 and a second end surface 2b2, and a pair of opposite outer surfaces arranged in the width direction W are respectively defined as a first side surface 2c1 and a second side surface 2c2. These terms are used in the following description.

As shown in FIGS. 1 to 3, the monolithic ceramic capacitor 1A according to this preferred embodiment preferably has a rectangular or substantially rectangular-parallelepiped shape configured such that the outside dimension in the length direction L is the longest dimension. The representative values of the outside dimension in the length direction L and the outside dimension in the width direction W (the outside dimension in the thickness direction T is generally equivalent to the outside dimension in the width direction W) of the monolithic ceramic capacitor 1A may preferably be, for example, about 3.2 mm×about 1.6 mm, about 2.0 mm×about 1.25 mm, about 1.6 mm×about 0.8 mm, about 1.0 mm×about 0.5 mm, about 0.8 mm×about 0.4 mm, about 0.6 mm×about 0.3 mm, about 0.4 mm×about 0.2 mm, and about 0.2 mm×about 0.1 mm.

As shown in FIGS. 2 and 3, the element body 2 is divided into a thickness-direction inner layer portion 6a, a thickness-direction first outer layer portion 6b1, and a thickness-direction second outer layer portion 6b2 in the thickness direction T.

The thickness-direction inner layer portion 6a includes the above-described multilayer portion 9, and includes the ceramic dielectric layers 3 and the inner electrode layers 4. Among these layers, the inner electrode layers 4 of the thickness-direction inner layer portion 6a include a portion of the inner electrode layer 4 included in the multilayer portion 9, a portion of the inner electrode layer 4 extending from one portion of the portion of the inner electrode layer 4 included in the multilayer portion 9 toward the first end surface 2b1 side and defining the first wiring portion 4c1 connected with the first outer electrode 5a, and a portion of the inner electrode layer 4 extending from another portion of the portion of the inner electrode layer 4 included in the multilayer portion 9 toward the second end surface 2b2 side and defining the second wiring portion 4c2 connected with the second outer electrode 5b.

The thickness-direction first outer layer portion 6b1 includes the ceramic dielectric layer 3, and does not include the inner electrode layer 4. The thickness-direction first outer layer portion 6b1 covers a surface of the thickness-direction inner layer portion 6a at the side at which the first principal surface 2a1 is located. Thus, the thickness-direction first outer layer portion 6b1 determines the first principal surface 2a1 of the element body 2.

The thickness-direction second outer layer portion 6b2 includes the ceramic dielectric layer 3, and does not include the inner electrode layer 4. The thickness-direction second outer layer portion 6b2 covers a surface of the thickness-direction inner layer portion 6a at the side at which the second principal surface 2a2 is located. Thus, the thickness-direction second outer layer portion 6b2 determines the second principal surface 2a2 of the element body 2.

With this configuration, the thickness-direction inner layer portion 6a is arranged between the thickness-direction first outer layer portion 6b1 and the thickness-direction second outer layer portion 6b2 in the thickness direction T. Among the inner electrode layers 4 included in the thickness-direction inner layer portion 6a, a first outermost layer 4a defining a first conductor layer arranged at a position closest to the first principal surface 2a1 side is provided at a position adjacent to the ceramic dielectric layer 3 of the above-described thickness-direction first outer layer portion 6b1. Among the inner electrode layers 4 included in the thickness-direction inner layer portion 6a, a second outermost layer 4b defining a second conductor layer arranged at a position closest to the second principal surface 2a2 side is provided at a position adjacent to the ceramic dielectric layer 3 of the above-described thickness-direction second outer layer portion 6b2.

Also, as shown in FIG. 2, the element body 2 is divided into a length-direction inner layer portion 7a, a length-direction first outer layer portion 7b1, and a length-direction second outer layer portion 7b2 in the length direction L.

The length-direction inner layer portion 7a includes the above-described multilayer portion 9, and includes the plurality of ceramic dielectric layers 3 and the plurality of inner electrode layers 4. Among these layers, the plurality of inner electrode layers 4 of the length-direction inner layer portion 7a include only a portion of the inner electrode layers 4 included in the multilayer portion 9.

The length-direction first outer layer portion 7b1 includes portions of the inner electrode layers 4 and the ceramic dielectric layers 3 of the first wiring portion 4c1. The length-direction first outer layer portion 7b1 covers a surface of the length-direction inner layer portion 7a at the side at which the first end surface 2b1 is located. Thus, the length-direction first outer layer portion 7b1 determines the first end surface 2b1 of the element body 2.

The length-direction second outer layer portion 7b2 includes portions of the inner electrode layers 4 and the ceramic dielectric layers 3 of the second wiring portion 4c2. The length-direction second outer layer portion 7b2 covers a surface of the length-direction inner layer portion 7a at the side at which the second end surface 2b2 is located. Thus, the length-direction second outer layer portion 7b2 determines the second end surface 2b2 of the element body 2.

With this configuration, the length-direction inner layer portion 7a is arranged between the length-direction first outer layer portion 7b1 and the length-direction second outer layer portion 7b2 in the length direction L.

Further, as shown in FIG. 3, the element body 2 is divided into a width-direction inner layer portion 8a, a width-direction first outer layer portion 8b1, and a width-direction second outer layer portion 8b2 in the width direction W.

The width-direction inner layer portion 8a includes the above-described multilayer portion 9, and includes the plurality of ceramic dielectric layers 3 and the plurality of inner electrode layers 4. Among these layers, the inner electrode layers 4 of the width-direction inner layer portion 8a include a portion of the inner electrode layers 4 included in the multilayer portion 9, a portion of the inner electrode layers 4 of the first wiring portion 4c1, and a portion of the inner electrode layers 4 of the second wiring portion 4c2.

The width-direction first outer layer portion 8b1 includes the ceramic dielectric layer 3, and does not include the inner electrode layer 4. The width-direction first outer layer portion 8b1 covers a surface of the width-direction inner layer portion 8a at the side at which the first side surface 2c1 is located, and thus, the width-direction first outer layer portion 8b1 determines the first side surface 2c1 of the element body 2.

The width-direction second outer layer portion 8b2 includes the ceramic dielectric layer 3, and does not include the inner electrode layer 4. The width-direction second outer layer portion 8b2 covers a surface of the width-direction inner layer portion 8a at the side at which the second side surface 2c2 is located, and thus, the width-direction second outer layer portion 8b2 determines the second side surface 2c2 of the element body 2.

With this configuration, the width-direction inner layer portion 8a is arranged between the width-direction first outer layer portion 8b1 and the width-direction second outer layer portion 8b2 in the width direction W.

As described above, in the monolithic ceramic capacitor 1A according to this preferred embodiment, the element body 2 includes the rectangular or substantially rectangular-parallelepiped-shaped multilayer portion 9, in which the plurality of inner electrode layers 4 and the plurality of ceramic dielectric layers 3 are alternately densely stacked, and the element body 2 is configured such that the outer layer portions defined by the ceramic dielectric layers 3, that is, the thickness-direction first outer layer portion 6b1, the thickness-direction second outer layer portion 6b2, the width-direction first outer layer portion 8b1, and the width-direction second outer layer portion 8b2, and the outer layer portions defined by the ceramic dielectric layers 3 and the relatively small number of inner electrode layers 4 defining and serving as the wiring portion included in the ceramic dielectric layers 3, that is, the length-direction first outer layer portion 7b1 and the length-direction second outer layer portion 7b2, cover the multilayer portion 9.

In the monolithic ceramic capacitor 1A according to this preferred embodiment, the conductor density of the first outermost layer 4a and the conductor density of the second outermost layer 4b are preferably lower than the conductor density of any of the other inner electrode layers 4 located between the first outermost layer 4a and the second outermost layer 4b. With this configuration, the capacity of the monolithic ceramic capacitor is increased while the occurrence of delamination is effectively reduced. The details are described below.

As shown in FIG. 4, the first outermost layer 4a is defined by a film of a conductor material having a predetermined thickness. The first outermost layer 4a includes a plurality of fine through holes penetrating through the first outermost layer 4a in the thickness direction T. The through holes are filled with a filling portion 3a made of a ceramic dielectric material. Thus, the first outermost layer 4a is discontinuous in any cross-section parallel or substantially parallel to the thickness direction T. Accordingly, the conductor density is relatively low. Although not shown, the second outermost layer 4b has a configuration the same or substantially the same as that of the first outermost layer 4a.

As described above, since the conductor densities of the first outermost layer 4a and the second outermost layer 4b are relatively low, the above-described filling portions 3a made of the ceramic dielectric material function as a type of support, i.e., anchor, that couples portions of the ceramic dielectric layers 3 sandwiching each of the first outermost layer 4a and the second outermost layer 4b. Thus, a high fixing force between each of the first outermost layer 4a and the second outermost layer 4b and the ceramic dielectric layer 3 located on an outer side portion of the corresponding outermost layer is maintained. Thus, the occurrence of delamination is effectively reduced at a boundary portion between the thickness-direction inner layer portion 6a and the thickness-direction first outer layer portion 6b1, and at a boundary portion between the thickness-direction inner layer portion 6a and the thickness-direction second outer layer portion 6b2.

In contrast, although the other inner electrode layers located between the first outermost layer 4a and the second outermost layer 4b are each defined by a film of a conductor material having a predetermined thickness, such an inner electrode layer 4 has relatively high continuity in any cross-section parallel or substantially parallel to the thickness direction T. Accordingly, the conductor density is relatively high.

As described above, since the conductor density of the other inner electrode layers 4 located between the first outermost layer 4a and the second outermost layer 4b is relatively high, the facing area between adjacent inner electrode layers 4 among these inner electrode layers 4 is increased, and thus, the capacity is increased.

Accordingly, as long as the conductor densities of the first outermost layer 4a and the second outermost layer 4b are lower than the conductor densities of the inner electrode layers 4 arranged between the first outermost layer 4a and the second outermost layer 4b, the capacity of the monolithic ceramic capacitor is increased while the occurrence of delamination is effectively reduced. In many cases, several hundreds of the inner electrode layers 4 are stacked. Thus, a decrease in capacity caused by decreasing the conductor densities of the first outermost layer 4a and the second outermost layer 4b is negligible as compared to the effect of reducing the occurrence of delamination.

Preferably, the conductor density of the first outermost layer 4a and the conductor density of the second outermost layer 4b are lower than the conductor density of the inner electrode layer 4 located between the first outermost layer 4a and the second outermost layer 4b preferably by, for example, about 5% to about 10%. For example, if the conductor density of the inner electrode layer 4 located between the first outermost layer 4a and the second outermost layer 4b preferably is about 70% to about 90%, the conductor density of the first outermost layer 4a and the conductor density of the second outermost layer 4b may preferably be about 60% to about 85%.

The conductor density of the first outermost layer 4a, the conductor density of the second outermost layer 4b, and the conductor density of the inner electrode layer 4 located between the first outermost layer 4a and the second outermost layer 4b can be measured, for example, by the following process.

First, the monolithic ceramic capacitor to be measured is sealed with sealing resin, and the monolithic ceramic capacitor with the sealing resin is ground. The grinding is advanced in the thickness direction T of the monolithic ceramic capacitor. Then, the grinding is stopped at a timing when the first outermost layer is exposed, at a timing when the inner electrode layer located in a center portion in the thickness direction T is exposed, and at a timing when the second outermost layer is exposed, and images of cross-sections at the timings at which the grinding is stopped are captured. The images of the cross-sections are captured by using an electron microscope (for example, scanning electron microscope (SEM)), and the magnification is preferably in a range from about 500 times to about 1000 times. Then, an image in a range to be measured is extracted from each captured image, binarization processing is executed on the extracted image, the area of a portion corresponding to the conductor material and the area of a portion not corresponding to the conductor material are measured, and the conductor density of each layer is calculated based on the measured areas. The calculated conductor densities of respective layers are compared, and a difference in density of each layer can be specified.

Figure 5:
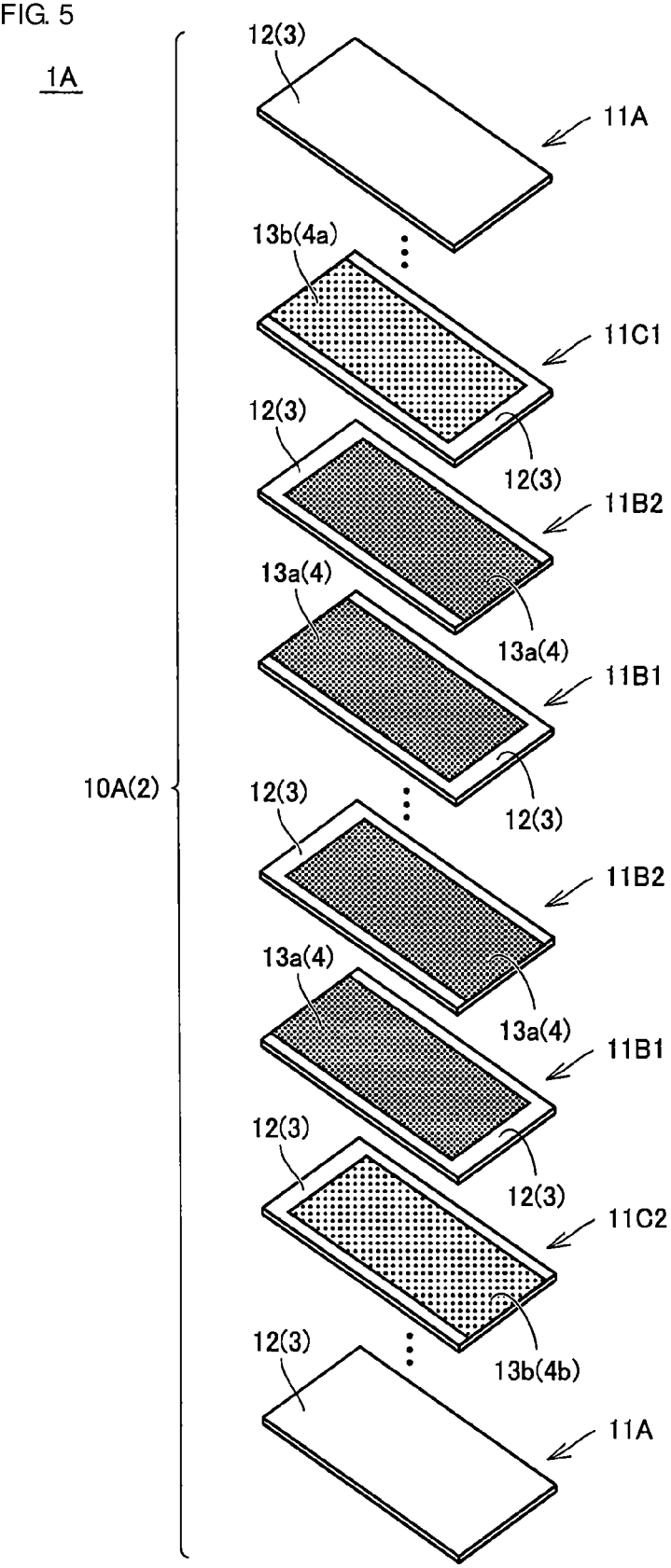
FIG. 5 is an exploded view showing a multilayer structure of an element body included in the monolithic ceramic capacitor shown in FIG. 1.

An example of a non-limiting method of causing the conductor densities of the first outermost layer 4a and the second outermost layer 4b to be lower than the conductor density of any of the inner electrode layers 4 located between the first outermost layer 4a and the second outermost layer 4b is described as follows. FIG. 5 is an exploded view showing a multilayer structure of the element body included in the monolithic ceramic capacitor shown in FIG. 1.

As shown in FIG. 5, the element body 2 is manufactured using a material sheet group 10A as a material including a plurality of material sheets 11A, 11B1, 11B2, 11C1, and 11C2 with different configurations. To be more specific, the element body is manufactured by stacking the plurality of material sheets 11A, 11B1, 11B2, 11C1, and 11C2 with the different configurations in a predetermined order, press-bonding the material sheets, and firing the material sheets.

The material sheet 11A is formed of only a ceramic base 12 and does not include a conductive pattern on its surface. The material sheet 11A becomes the ceramic dielectric layer 3 of a portion that defines the thickness-direction first outer layer portion 6b1 or the thickness-direction second outer layer portion 6b2 after firing.

The material sheets 11B1 and 11B2 each include a conductive pattern 13a having a predetermined shape formed on a surface of a ceramic base 12. The conductive pattern 13a of the material sheets 11B1 and 11B2 becomes a portion of the inner electrode layer 4 excluding the first outermost layer 4a and the second outermost layer 4b after firing. Also, the ceramic base 12 of each of the material sheets 11B1 and 11B2 becomes a portion of the ceramic dielectric layer 3 that defines the thickness-direction inner layer portion 6a after firing.

The material sheets 11C1 and 11C2 each include a conductive pattern 13b having a predetermined shape formed on a surface of a ceramic base 12. The conductive patterns 13b of the material sheets 11C1 and 11C2 become the first outermost layer 4a and the second outermost layer 4b among the inner electrode layers 4 after firing. Also, the ceramic base 12 of the material sheet 11C1 becomes a portion of the ceramic dielectric layer 3 that defines the thickness-direction inner layer portion 6a after firing. The ceramic base 12 of the material sheet 11C2 becomes a portion of the ceramic dielectric layer 3 that defines the thickness-direction second outer layer portion 6b2 after firing.

Each of the above-described conductive patterns 13a and 13b can be formed by applying the conductor paste to the surface of the ceramic base 12, for example, by screen printing or gravure printing. In this case, for the conductive pattern 13a that becomes the portion of the inner electrode layer 4 excluding the first outermost layer 4a and the second outermost layer 4b after firing, the thickness of the conductor paste to be applied is relatively large. For the conductive pattern 13b that becomes the first outermost layer 4a and the second outermost layer 4b among the inner electrode layers 4 after firing, the thickness of the conductor paste to be applied is relatively small.

Accordingly, the conductor densities of the first outermost layer 4a and the second outermost layer 4b after firing are lower than the conductor density of any of the inner electrode layers 4 located between the first outermost layer 4a and the second outermost layer 4b. Many filling portions 3a (described above) are provided in the first outermost layer 4a and the second outermost layer 4b.

As a method of changing the thickness of the conductor paste to be applied to the ceramic base 12, in the case of screen printing, the amount of the conductor paste to be transferred on the ceramic base 12 can be controlled by adjusting the size of a mesh provided on a screen printing plate (that is, the size of holes). In the case of gravure printing, the amount of the conductor paste to be transferred on the ceramic base 12 can be controlled by adjusting the size of a pattern of a gravure plate and adjusting the viscosity of the conductor paste.

Figure 6:
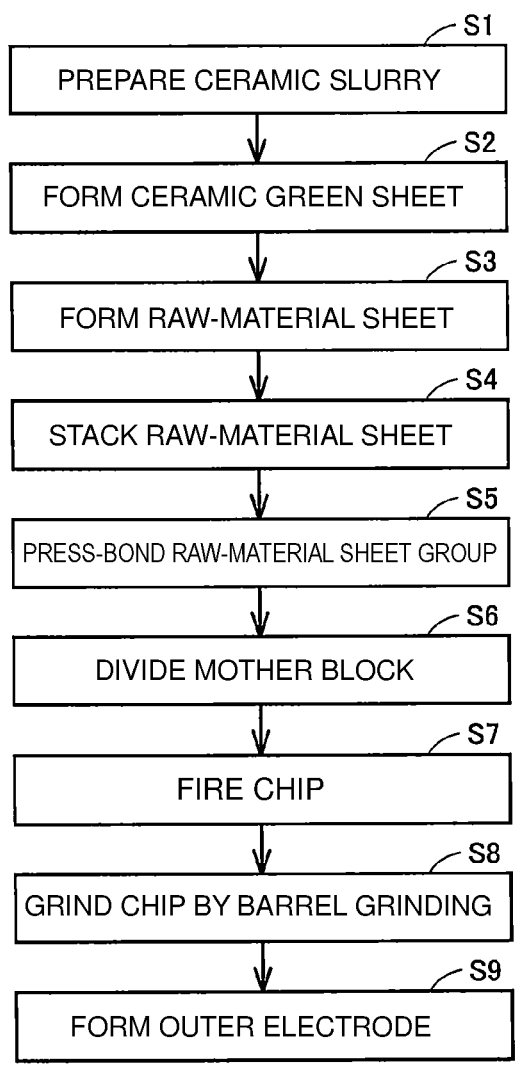
FIG. 6 is an illustration showing a manufacturing flow of the monolithic ceramic capacitor shown in FIG. 1.

FIG. 6 is an illustration showing a non-limiting example of a manufacturing flow of the monolithic ceramic capacitor shown in FIG. 1. Next, a manufacturing flow of the monolithic ceramic capacitor 1A according to this preferred embodiment is described with reference to FIG. 6. The manufacturing flow of the monolithic ceramic capacitor 1A described below is manufacturing a mother block by collectively executing processing until an intermediate phase of the manufacturing process, then dividing the mother block into individual chips, and further executing processing on the individual chips, so that a plurality of the monolithic ceramic capacitors 1A are manufactured simultaneously in a large quantity.

As shown in FIG. 6, when the above-described monolithic ceramic capacitor 1A is manufactured, first, ceramic slurry is prepared (step S1). More specifically, ceramic powder, a binder, a solvent, and other suitable ingredients, are mixed by a predetermined formulation ratio to produce the ceramic slurry.

Then, a ceramic green sheet is formed (step S2). More specifically, the ceramic green sheet is manufactured by molding the ceramic slurry in a substantially sheet shaped configuration on a carrier film using, for example, a die coater, a gravure coater, a microgravure coater, or other suitable coater.

Then, a raw-material sheet is formed (step S3). More specifically, the raw-material sheet with a predetermined conductive pattern provided on the ceramic green sheet is formed by printing the conductor paste on the ceramic green sheet by screen printing or gravure printing so that the conductor paste has a predetermined pattern, for example.

The raw-material sheet to be manufactured has a layout such that a plurality of material sheets having the same or substantially the same shape are arranged in a matrix in plan on a material sheet for each of the material sheets 11B1, 11B2, 11C1, and 11C2 shown in FIG. 5 as a unit.

Since the material sheet 11B1 and the material sheet 11B2 have the same or substantially the same shape, raw-material sheets including the material sheet 11B1 and the material sheet 11B2 may utilize raw-material sheets having the same or substantially the same conductive pattern. By stacking the raw-material sheets having the same or substantially the same conductive pattern so as to be shifted by a half pitch in a stacking step of the raw-material sheets (described later), the multilayer structure of the material sheets 11B1 and 11B2 shown in FIG. 5 can be obtained.

Also, since the material sheet 11C1 and the material sheet 11C2 have the same or substantially the same shape, raw-material sheets including the material sheet 11C1 and the material sheet 11C2 may utilize raw-material sheets having the same or substantially the same conductive pattern. By stacking the raw-material sheets having the same or substantially the same conductive pattern so as to be shifted by a half pitch in a stacking step of the raw-material sheets (described later), the multilayer structure of the material sheets 11C1 and 11C2 shown in FIG. 6 can be obtained.

On each of the raw-material sheets including the material sheets 11B1 and 11B2, the conductive pattern 13a is preferably formed with a relatively large thickness as described above. On each of the raw-material sheets including the material sheets 11C1 and 11C2, the conductive pattern 13b is preferably formed with a relatively small thickness as described above.

In addition to the raw-material sheets having the above-described conductive patterns 13a and 13b, raw-material sheets formed of only ceramic green sheets manufactured without the step S3 are also prepared.

Then, the raw-material sheets are stacked (step S4). More specifically, the above-described plurality of raw-material sheets are stacked under a predetermined rule, and hence the raw-material sheets are arranged so that the above-described unit has a multilayer structure as shown in FIG. 5 in the stack direction in the raw-material sheet group after stacking.

Then, the raw-material sheet group is press-bonded (step S5). More specifically, the raw-material sheet group is pressed in the stacking direction by using, for example, hydrostatic pressing, and thus, the raw-material sheet group is press-bonded. Accordingly, the above-described mother block is manufactured.

Then, the mother block is divided (step S6). More specifically, press-cutting or dicing is performed such that the mother block is divided into a matrix. Accordingly, the chips are cut. The cut chips each have the multilayer structure shown in FIG. 5.

Then, the chip is fired (step S7). More specifically, the cut chip is heated at a predetermined temperature such that the ceramic dielectric material and the conductor material are sintered. If it is assumed that the chip is sintered in an oxidized atmosphere, more of the filling portions 3a are formed in the above-described first outermost layer 4a and second outermost layer 4b. Thus, the occurrence of delamination is further reliably reduced.

Then, the chip is ground by barrel grinding (step S8). More specifically, the chip after sintering is sealed in a small box called a barrel with medium balls with a higher hardness than the hardness of the ceramic material, the barrel is rotated, and the chip is ground. Accordingly, the outer surfaces (in particular, an edge portion and a corner portion) of the chip are rounded. Thus, the above-described element body 2 is formed.

Then, an outer electrode is formed (step S9). More specifically, metal films are formed by applying the conductor paste on an end portion of a portion including the first end surface 2b1 and an end portion of a portion including the second end surface 2b2 of the element body 2, the formed metal films are sintered, and then Ni plating and Sn plating are successively applied to the metal films. Accordingly, the first outer electrode 5a and the second outer electrode 5b are formed on the outer surfaces of the element body 2.

By performing the above-described series of steps, the manufacturing of the monolithic ceramic capacitor 1A having the structure shown in FIGS. 1 to 3 is completed.

As described above, in the monolithic ceramic capacitor 1A according to this preferred embodiment, as long as the conductor densities of the first outermost layer 4a and the second outermost layer 4b are lower than the conductor density of any of the inner electrode layers 4 located between the first outermost layer 4a and the second outermost layer 4b, the capacity of the monolithic ceramic capacitor is increased while the occurrence of delamination is effectively reduced. Accordingly, the reliability of the product is increased, and the yield of the manufacturing process is prevented from begin decreased.

Figure 7:
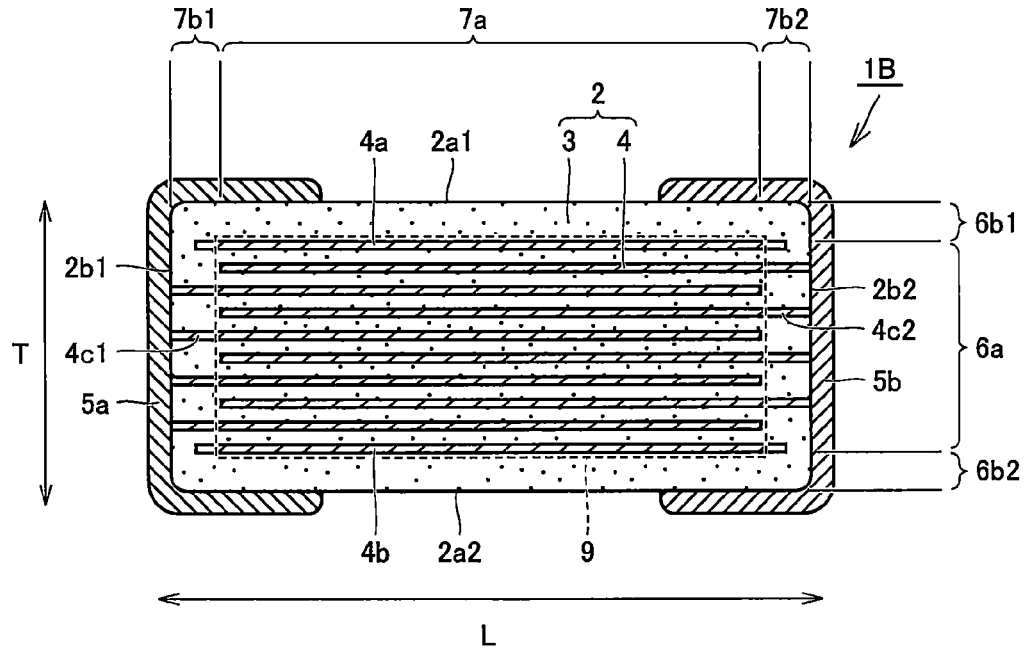
FIG. 7 is a schematic cross-sectional view of a monolithic ceramic capacitor according to a modification based on the first preferred embodiment of the present invention.

FIG. 7 is a schematic cross-sectional view of a monolithic ceramic capacitor according to a modification based on this preferred embodiment. Next, a monolithic ceramic capacitor 1B according to the modification based on this preferred embodiment is described with reference to FIG. 7.

As shown in FIG. 7, the monolithic ceramic capacitor 1B according to this modification differs from the monolithic ceramic capacitor 1A according to the above-described preferred embodiment in that the first outermost layer 4a and the second outermost layer 4b are not connected with the first outer electrode 5a or the second outer electrode 5b, and both the first outermost layer 4a and the second outermost layer 4b are defined by stray (floating) conductor layers.

Even with this configuration, similarly to the monolithic ceramic capacitor 1A according to the above-described preferred embodiment, as long as the conductor densities of the first outermost layer 4a and the second outermost layer 4b are lower than the conductor density of any of the inner electrode layers 4 located between the first outermost layer 4a and the second outermost layer 4b, the capacity of the monolithic ceramic capacitor is increased while the occurrence of delamination is effectively reduced. As described above, in many cases, since several hundreds of the inner electrode layers 4 are stacked, a decrease in capacity caused when the first outermost layer 4a and the second outermost layer 4b are each defined by the stray (floating) conductor layer is negligible as compared to the effect of reducing the occurrence of delamination.

Second Preferred Embodiment

Figure 8:
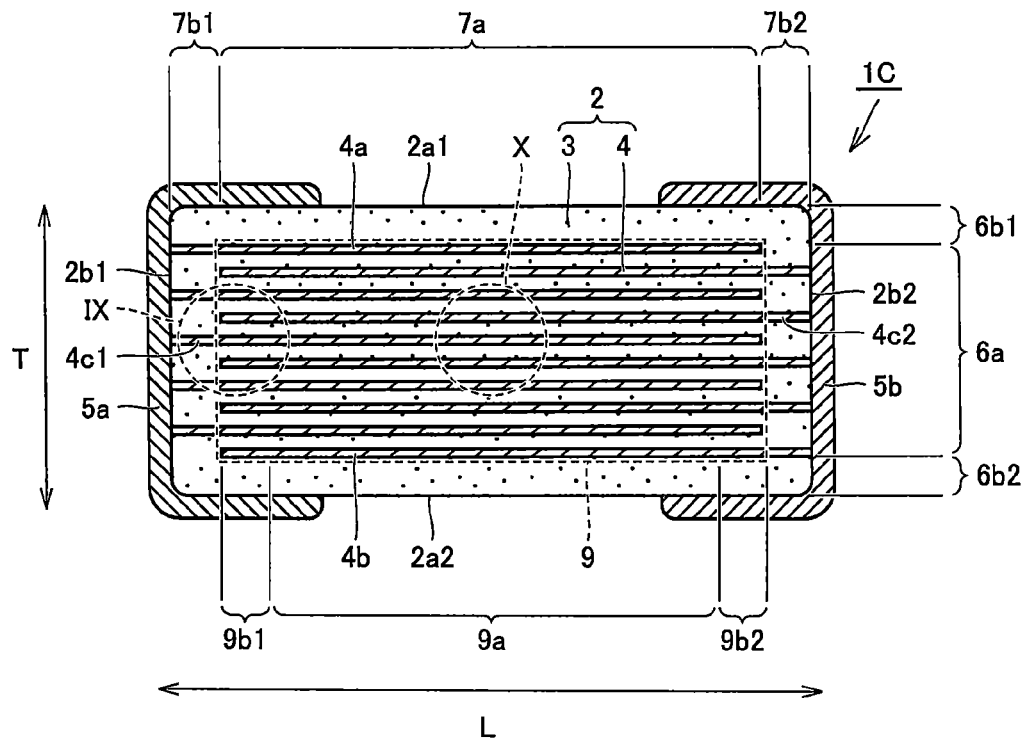
FIG. 8 is a schematic cross-sectional view of a monolithic ceramic capacitor according to a second preferred embodiment of the present invention.
Figure 9:
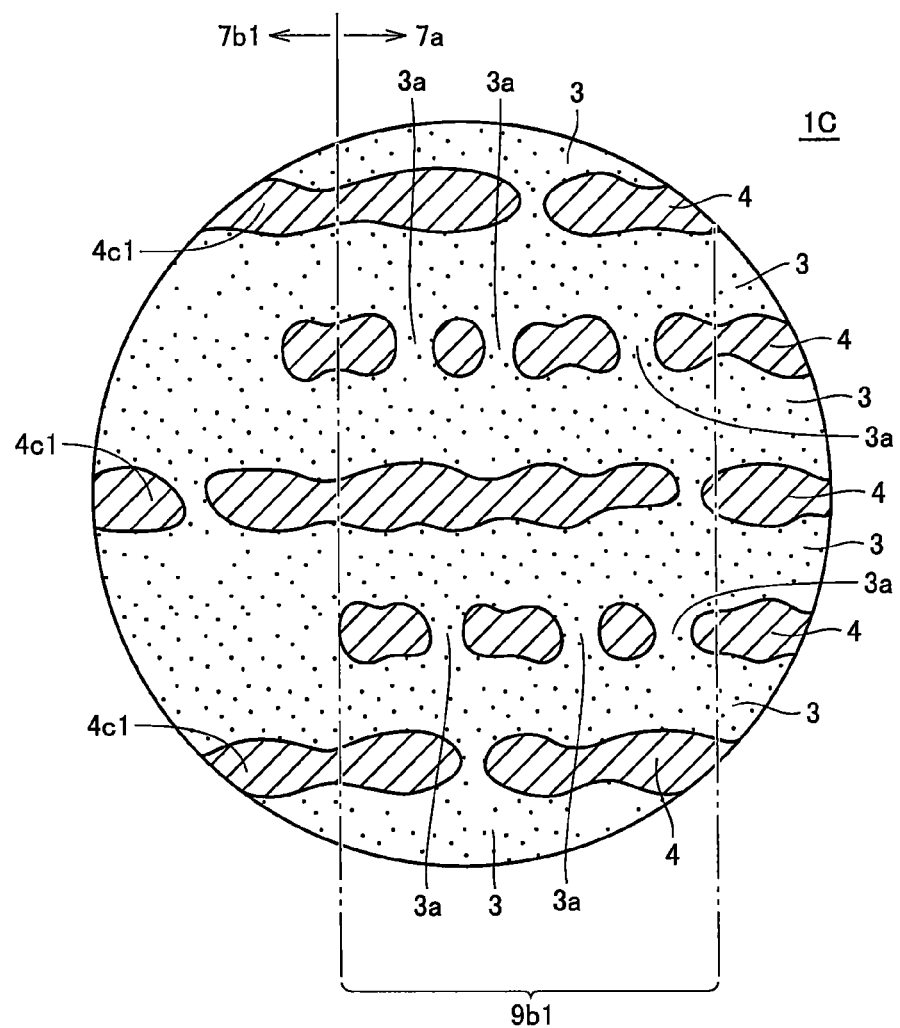
FIG. 9 is an enlarged view of region IX in FIG. 8.
Figure 10:
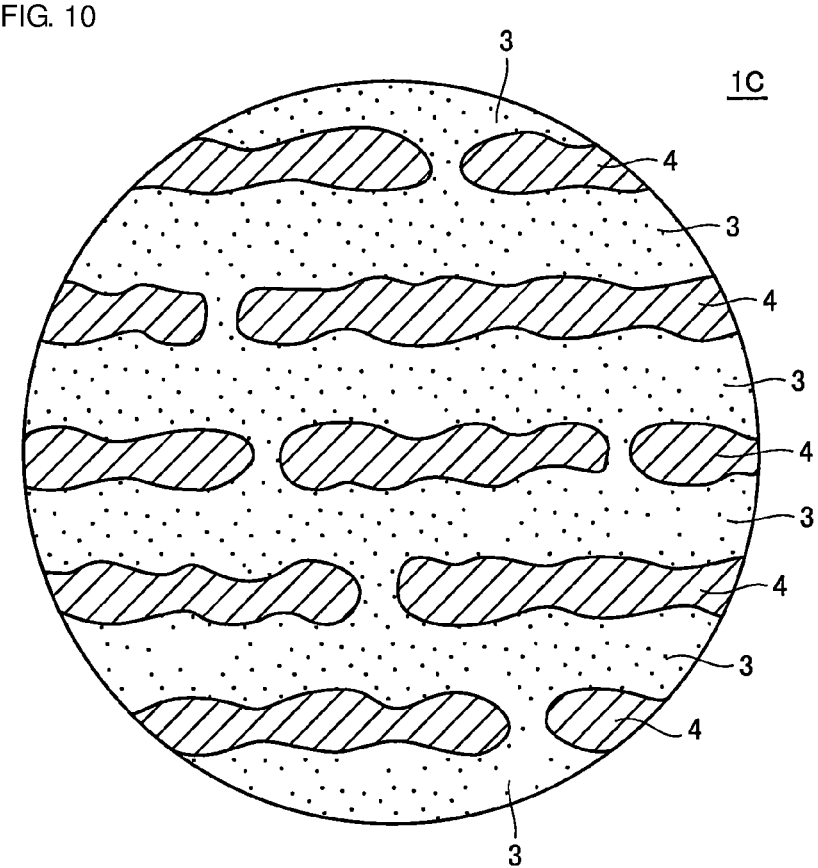
FIG. 10 is an enlarged view of region X in FIG. 8.

FIG. 8 is a schematic cross-sectional view of a monolithic ceramic capacitor according to a second preferred embodiment of the present invention. Also, FIGS. 9 and 10 are enlarged views of region IX and region X shown in FIG. 8. First, a configuration of a monolithic ceramic capacitor 1C according to this preferred embodiment is described with reference to FIGS. 8 to 10.

As shown in FIGS. 8 to 10, the monolithic ceramic capacitor 1C according to this preferred embodiment differs from the monolithic ceramic capacitor 1A according to the above-described first preferred embodiment in the configuration of the inner electrode layer 4, and more specifically, in that a portion of the plurality of inner electrode layers 4 having a lower conductor density than the conductor density of the other portion is different from that portion of the monolithic ceramic capacitor 1A according to the above-described first preferred embodiment.

In the monolithic ceramic capacitor 1C according to this preferred embodiment, unlike the monolithic ceramic capacitor 1A according to the above-described first preferred embodiment, the conductor density of the first outermost layer 4a and the conductor density of the second outermost layer 4b are preferably equivalent or substantially equivalent to the density of the conductive material in the other inner electrode layer 4 located between the first outermost layer 4a and the second outermost layer 4b. However, the conductor densities of all inner electrode layers 4 including the first outermost layer 4a and the second outermost layer 4b change along in the length direction L.

More specifically, the conductor density of a length-direction first end portion region 9b1 located at the first end surface 2b1 side in the multilayer portion 9 and the conductor density of a length-direction second end portion region 9b2 located at the second end surface 2b2 side in the multilayer portion 9 are lower than the conductor density of a length-direction center portion region 9a located at the center in the length direction L in the multilayer portion 9. With this configuration, the capacity of the monolithic ceramic capacitor is increased while the occurrence of delamination is effectively reduced. The details are described below.

As shown in FIG. 9, in the length-direction first end portion region 9b1, the inner electrode layer 4 connected with the second outer electrode 5b among the plurality of inner electrode layers 4 includes a plurality of fine through holes penetrating through the inner electrode layer 4 in the thickness direction T, and the through holes are preferably filled with filling portions 3a made of a ceramic dielectric material. Accordingly, a portion of the inner electrode layer 4 connected to the second outer electrode 5b and included in the length-direction first end portion region 9b1 is discontinuous in any cross-section parallel or substantially parallel to the thickness direction T, and thus, has a relatively low conductor density.

Also, although not shown, in the length-direction second end portion region 9b2, the inner electrode layer 4 connected with the first outer electrode 5a among the plurality of inner electrode layers 4 includes a plurality of fine through holes penetrating through the inner electrode layer 4 in the thickness direction T, and the through holes are preferably filled with filling portions 3a made of a ceramic dielectric material. Accordingly, a portion of the inner electrode layer 4 connected to the first outer electrode 5a and included in the length-direction second end portion region 9b2 is discontinuous in any cross-section parallel or substantially to the thickness direction T, and thus, has a relatively low conductor density.

In this manner, since the conductor density of a portion of the inner electrode layers 4 in the portions included in the length-direction first end portion region 9b1 and the length-direction second end portion region 9b2 is relatively low, each of the above-described filling portions 3a made of the ceramic dielectric material functions as a support, i.e., anchor, that couples portions of the ceramic dielectric layers 3 sandwiching the portion of the inner electrode layer 4. A high fixing force between the portion of the inner electrode layer 4 and the ceramic dielectric layers 3 sandwiching the portion of the inner electrode layer 4 is maintained. The occurrence of delamination, which starts at a boundary portion between the length-direction inner layer portion 7a and the length-direction first outer layer portion 7b1, and a boundary portion between the length-direction inner layer portion 7a and the length-direction second outer layer portion 7b2, is effectively reduced.

The size in the length direction L of the length-direction first end portion region 9b1, which is a region including the portion that has a lower conductor density than the conductor density of the other portion of the inner electrode layer 4 connected with the second outer electrode 5b, is not particularly limited. However, if the size is determined such that the distance from the end portion at the first end surface 2b1 side of the inner electrode layer 4 connected with the second outer electrode 5b is preferably within a range of about 10 μm, the occurrence of delamination, which starts at the boundary portion between the length-direction inner layer portion 7a and the length-direction first outer layer portion 7b1, is further reliably reduced.

Also, the size in the length direction L of the length-direction second end portion region 9b2, which is a region including the portion that should have a lower conductor density than the conductor density of the other portion of the inner electrode layer 4 connected with the first outer electrode 5a, is not particularly limited. However, if the size is determined such that the distance from the end portion at the second end surface 2b2 side of the inner electrode layer 4 connected with the first outer electrode 5a is preferably within a range of about 10 μm, the occurrence of delamination, which starts at the boundary portion between the length-direction inner layer portion 7a and the length-direction second outer layer portion 7b2, is further reliably reduced.

In contrast, as shown in FIG. 10, in the length-direction center portion region 9a, all of the plurality of inner electrode layers 4 have relatively high continuity in any cross-section parallel or substantially parallel to the thickness direction T. Thus, the conductor density is relatively high.

In this manner, since the conductor densities of the inner electrode layers 4 included in the length-direction center portion region 9a are relatively high, the facing area between adjacent inner electrode layers 4 among the inner electrode layers 4 is increased, and the capacity is increased.

Since the conductor density in the length-direction first end portion region 9b1 and the conductor density in the length-direction second end portion region 9b2 are lower than the conductor density in the length-direction center portion region 9a, the capacity of the monolithic ceramic capacitor is increased while the occurrence of delamination is effectively reduced. The size of the length-direction first end portion region 9b1 and the length-direction second end portion region 9b2 may be very small as described above, the decrease in capacity caused when the conductor density of a portion of the inner electrode layers 4 included in the portions is decreased is almost negligible as compared to the effect of reducing the occurrence of delamination.

Preferably, the conductor density of the portion of the inner electrode layer 4 connected with the second outer electrode 5b and included in the length-direction first end portion region 9b1 and the conductor density of the portion of the inner electrode layer 4 connected with the first outer electrode 5a and included in the length-direction second end portion region 9b2 are lower than the conductor density of the portion of the inner electrode layer 4 included in the length-direction center portion region 9a preferably by, for example, about 5% to about 10%. For example, if the conductor density of the portion of the inner electrode layer 4 included in the length-direction center portion region 9a preferably is about 70% to about 90%, the conductor density of the portion of the inner electrode layer 4 connected with the second outer electrode 5b and included in the length-direction first end portion region 9b1 and the conductor density of the portion of the inner electrode layer 4 connected with the first outer electrode 5a and included in the length-direction second end portion region 9b2 may preferably be about 60% to about 85%, for example.

The conductor density of the portion of the inner electrode layer 4 connected with the second outer electrode 5b and included in the length-direction first end portion region 9b1, the conductor density of the portion of the inner electrode layer 4 connected with the first outer electrode 5a and included in the length-direction second end portion region 9b2, and the conductor density of the portion of the inner electrode layer 4 included in the length-direction center portion region 9a can be measured by the measuring method using the electron microscope described in the aforementioned first preferred embodiment. More specifically, the measurement can be performed by setting the cross-section exposed during grinding at a cross-section including the length-direction first end portion region 9b1, a cross-section including the length-direction center portion region 9a, and a cross-section including the length-direction second end portion region 9b2, or at a cross-section collectively including the length-direction first end portion region 9b1, the length-direction center portion region 9a, and the length-direction second end portion region 9b2.

Figure 11:
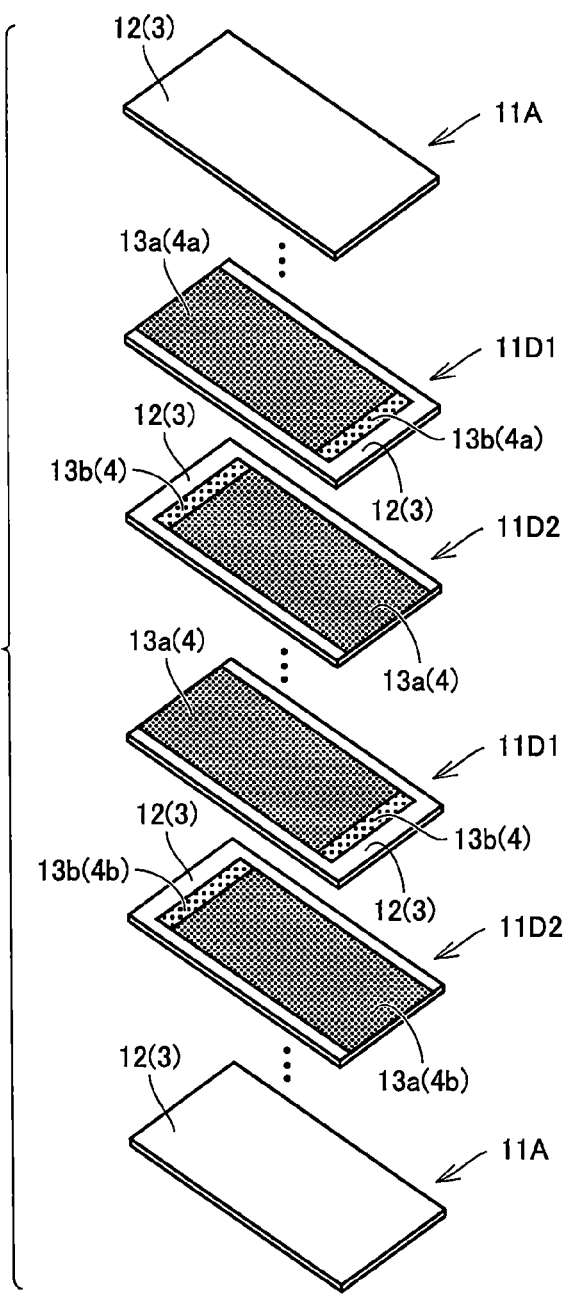
FIG. 11 is an exploded view showing a multilayer structure of an element body included in the monolithic ceramic capacitor shown in FIG. 8.

An example of a non-limiting method of causing the conductor density in the length-direction first end portion region 9b1 and the conductor density in the length-direction second end portion region 9b2 to be lower than the conductor density in the length-direction center portion region 9a is described below. FIG. 11 is an exploded view showing a multilayer structure of an element body included in the monolithic ceramic capacitor shown in FIG. 8.

As shown in FIG. 11, the element body 2 is manufactured using a material sheet group 10C as a material including a plurality of material sheets 11A, 11D1, and 11D2 with different configurations. More specifically, the element body 2 is manufactured by stacking the plurality of material sheets 11A, 11D1, and 11D2 with the different configurations in a predetermined order, press-bonding the material sheets, and firing the material sheets.

The material sheet 11A is formed of only a ceramic base 12 and does not include a conductive pattern on its surface. The material sheet 11A becomes a portion of the ceramic dielectric layer 3 that defines the thickness-direction first outer layer portion 6b1 or the thickness-direction second outer layer portion 6b2 after firing.

The material sheets 11D1 and 11D2 each include conductive patterns 13a and 13b having predetermined shapes provided on a surface of a ceramic base 12. The conductive pattern 13a is a conductive pattern of a portion that is included primarily in the length-direction center portion region 9a and the first wiring portion 4c1 or the second wiring portion 4c2 after firing, and is strip-shaped or substantially strip shaped extending in the length direction L. The conductive pattern 13b is a conductive pattern of a portion that is included primarily in the length-direction first end portion region 9b1 or the length-direction second end portion region 9b2 after firing, and is located at one end portion side of the conductive pattern 13a so as to extend in the length direction L. Also, the ceramic base 12 of each of the material sheets 11D1 and 11D2 becomes the ceramic dielectric layer 3 of a portion that defines the thickness-direction inner layer portion 6a or the thickness-direction second outer layer portion 6b2 after firing.

Similarly to the first preferred embodiment, the above-described conductive patterns 13a and 13b are configured to have different thicknesses by adjusting the amount of conductor paste to be applied to the ceramic bases 12. Accordingly, the conductor density in the length-direction first end portion region 9b1 and the conductor density in the length-direction second end portion region 9b2 is preferably lower than the conductor density in the length-direction center portion region 9a during firing.

As describe above, in the monolithic ceramic capacitor 1C according to this preferred embodiment, since the conductor density in the length-direction first end portion region 9b1 and the conductor density in the length-direction second end portion region 9b2 are lower than the conductor density in the length-direction center portion region 9a, the capacity of the monolithic ceramic capacitor is increased while the occurrence of delamination is effectively reduced. Accordingly, the reliability of the product is increased, and the yield of the manufacturing process is prevented from being decreased.

Third Preferred Embodiment

Figure 12:
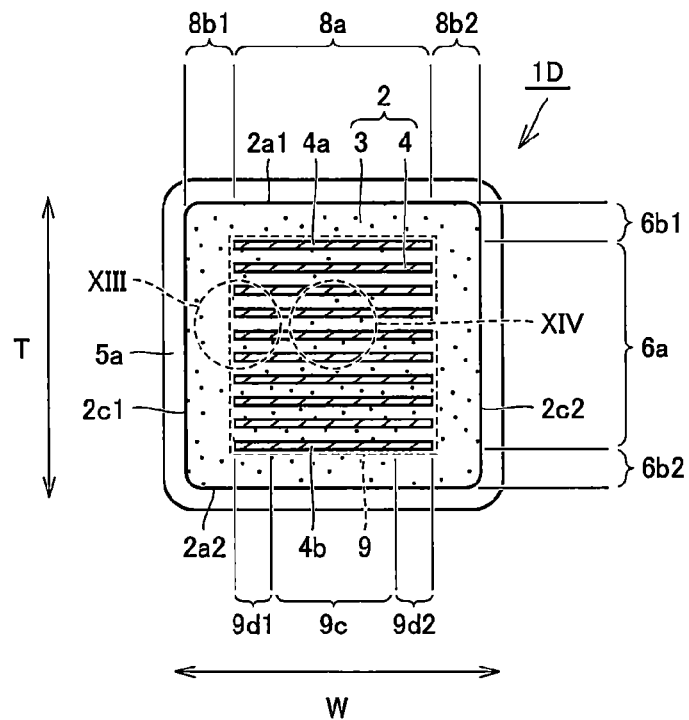
FIG. 12 is a schematic cross-sectional view of a monolithic ceramic capacitor according to a third preferred embodiment of the present invention.
Figure 13:
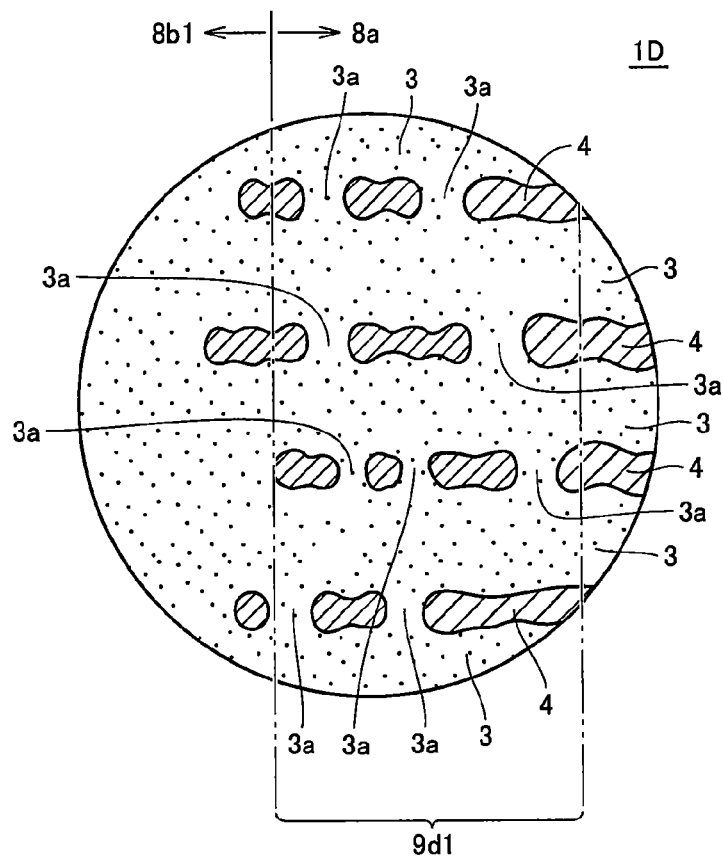
FIG. 13 is an enlarged view of region XIII in FIG. 12.
Figure 14:
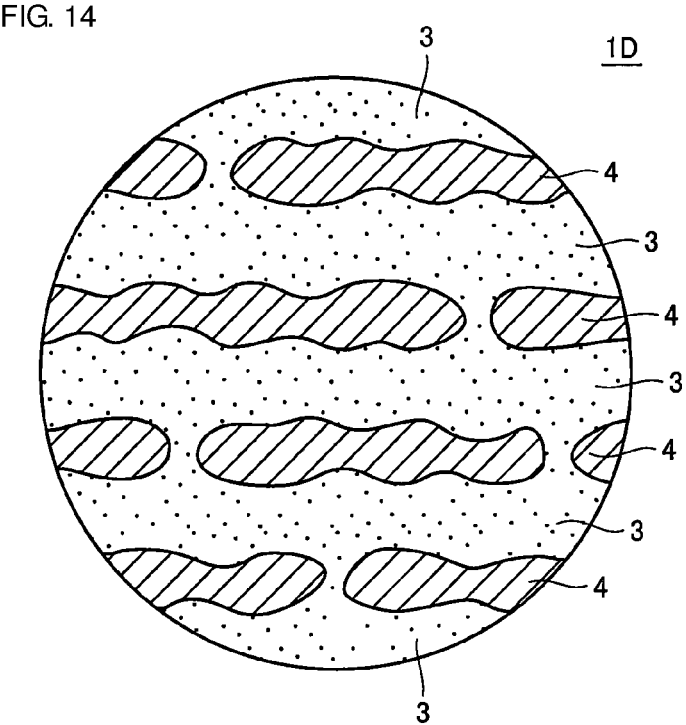
FIG. 14 is an enlarged view of region XIV in FIG. 12.

FIG. 12 is a schematic cross-sectional view of a monolithic ceramic capacitor according to a third preferred embodiment of the present invention. FIGS. 13 and 14 are enlarged views of region XIII and region XIV shown in FIG. 12. A configuration of a monolithic ceramic capacitor 1D according to this preferred embodiment is described with reference to FIGS. 12 to 14.

As shown in FIGS. 12 to 14, the monolithic ceramic capacitor 1D according to this preferred embodiment differs from the monolithic ceramic capacitor 1A according to the above-described first preferred embodiment in the configuration of the inner electrode layer 4, and more specifically, in that a portion of the plurality of inner electrode layers 4 having a lower conductor density than the conductor density of the other portion is different from that portion of the monolithic ceramic capacitor 1A according to the first preferred embodiment.

In the monolithic ceramic capacitor 1D according to this preferred embodiment, unlike the monolithic ceramic capacitor 1A according to the above-described first preferred embodiment, the conductor density of the first outermost layer 4a and the conductor density of the second outermost layer 4b are preferably equivalent or substantially equivalent to the density of the conductive material of the other inner electrode layer 4 located between the first outermost layer 4a and the second outermost layer 4b. However, the conductor densities of all inner electrode layers 4 including the first outermost layer 4a and the second outermost layer 4b change along the width direction W.

More specifically, the conductor density in a width-direction first end portion region 9d1 located at the first side surface 2c1 in the multilayer portion 9 and the conductor density in a width-direction second end portion region 9d2 located at the second side surface 2c2 in the multilayer portion 9 are preferably lower than the conductor density in a width-direction center portion region 9c located at the center in the width direction W in the multilayer portion 9. With this configuration, the capacity of the monolithic ceramic capacitor is increased while the occurrence of delamination is effectively reduced. The details are described below.

As shown in FIG. 13, in the width-direction first end portion region 9d1, the plurality of inner electrode layers 4 include a plurality of fine through holes penetrating through the inner electrode layers 4 in the thickness direction T, and the through holes are filled with filling portions 3a made of a ceramic dielectric material. Thus, a portion of the inner electrode layers 4 included in the width-direction first end portion region 9d1 is discontinuous in any cross-section parallel or substantially parallel to the thickness direction T, the conductor density is relatively low.

Also, although not shown, in the width-direction second end portion region 9d2, the plurality of inner electrode layers 4 include a plurality of fine through holes penetrating through the inner electrode layers 4 in the thickness direction T, and the through holes are filled with filling portions 3a made of a ceramic dielectric material. Thus, a portion of the inner electrode layers 4 included in the width-direction second end portion region 9d2 is discontinuous in any cross-section parallel or substantially parallel to the thickness direction T, and conductor density is relatively low.

In this manner, since the conductor densities of the portions of the inner electrode layers 4 included in the width-direction first end portion region 9d1 and the width-direction second end portion region 9d2 are relatively low, the above-described filling portion 3a made of the ceramic dielectric material functions as a support, i.e., an anchor, that couples portions of the ceramic dielectric layers 3 sandwiching the portion of the inner electrode layer 4. A high fixing force between the portion of the inner electrode layer 4 and the ceramic dielectric layers 3 sandwiching the portion of the inner electrode layer 4 is maintained. The occurrence of delamination, which starts at a boundary portion between the width-direction inner layer portion 8a and the width-direction first outer layer portion 8b1, and a boundary portion between the width-direction inner layer portion 8a and the width-direction second outer layer portion 8b2, is effectively reduced.

The size in the width direction W of the width-direction first end portion region 9d1, which is a region including the portion of the inner electrode layer 4 having a conductor density lower than the conductor density of the other portion, is not particularly limited. However, if the size is determined such that the distance from the end portion at the first side surface 2c1 side of the inner electrode layer 4 is preferably within about 10 μm, for example, the occurrence of delamination, which starts at the boundary portion between the width-direction inner layer portion 8a and the width-direction first outer layer portion 8b1, is reliably reduced.

Also, the size in the width direction W of the width-direction second end portion region 9d2, which is a region including the portion of the inner electrode layer 4 having the conductor density lower than the conductor density of the other portion, is not particularly limited. However, if the size is determined such that the distance from the end portion at the second side surface 2c2 side of the inner electrode layer 4 is preferably within about 10 μm, for example, the occurrence of delamination, which starts at the boundary portion between the width-direction inner layer portion 8a and the width-direction second outer layer portion 8b2, is reliably reduced.

In contrast, as shown in FIG. 14, in the width-direction center portion region 9c, all of the plurality of inner electrode layers 4 have relatively high continuity in any cross-section parallel or substantially parallel to the thickness direction T. Thus, the conductor density is relatively high.

In this manner, since the conductor density of the inner electrode layer 4 included in the width-direction center portion region 9c is relatively high, the facing area between the adjacent inner electrode layers 4 among the inner electrode layers 4 is increased, and the capacity is increased.

Since the conductor density in the width-direction first end portion region 9d1 and the conductor density in the width-direction second end portion region 9d2 are lower than the conductor density in the width-direction center portion region 9c, the capacity of the monolithic ceramic capacitor is increased while the occurrence of delamination is effectively reduced. The size of the width-direction first end portion region 9d1 and the size of the width-direction second end portion region 9d2 may be very small as described above, the decrease in capacity caused when the conductor density of the inner electrode layer 4 included in the portion is decreased is almost negligible as compared to the effect of reducing the occurrence of delamination.

Preferably, the conductor density of the portion of the inner electrode layer 4 included in the width-direction first end portion region 9d1 and the conductor density of the portion of the inner electrode layer 4 included in the width-direction second end portion region 9d2 are lower than the conductor density of the portion of the inner electrode layer 4 included in the width-direction center portion region 9c preferably by, for example, about 5% to about 10%. For example, if the conductive density of the portion of the inner electrode layer 4 included in the width-direction center portion region 9c preferably is about 70% to about 90%, the conductor density of the portion of the inner electrode layer 4 included in the width-direction first end portion region 9d1 and the conductor density of the portion of the inner electrode layer 4 included in the width-direction second end portion region 9d2 may preferably be about 60% to about 85%.

The conductor density of the portion of the inner electrode layer 4 included in the width-direction first end portion region 9d1, the conductor density of the portion of the inner electrode layer 4 included in the width-direction second end portion region 9d2, and the conductor density of the portion of the inner electrode layer 4 included in the width-direction center portion region 9c can be measured by the measuring method using the electron microscope described in the first preferred embodiment. More specifically, the measurement can be performed by setting the cross-section to be exposed during grinding at a cross-section including the width-direction first end portion region 9d1, a cross-section including the width-direction center portion region 9c, and a cross-section including the width-direction second end portion region 9d2, or at a cross-section collectively including the width-direction first end portion region 9d1, the width-direction center portion region 9c, and the width-direction second end portion region 9d2.

Figure 15:
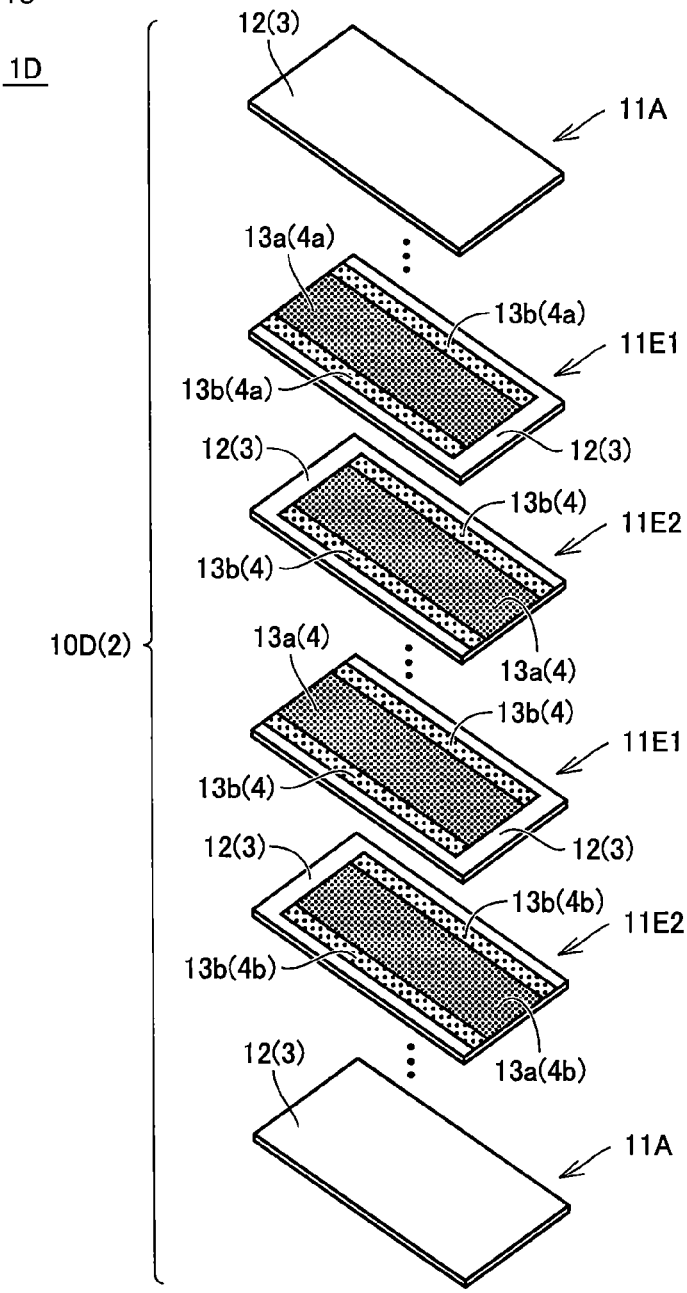
FIG. 15 is an exploded view showing a multilayer structure of an element body included in the monolithic ceramic capacitor shown in FIG. 12.

An example of a non-limiting method of causing the conductor density in the width-direction first end portion region 9d1 and the conductor density in the width-direction second end portion region 9d2 to be lower than the conductor density in the width-direction center portion region 9c is described below. FIG. 15 is an exploded view showing a multilayer structure of an element body included in the monolithic ceramic capacitor shown in FIG. 12.

As shown in FIG. 15, the element body 2 is manufactured using a material sheet group 10D as a material including a plurality of material sheets 11A, 11E1, and 11E2 with different configurations. More specifically, the element body 2 is manufactured by stacking the plurality of material sheets 11A, 11E1, and 11E2 with the different configurations in a predetermined order, press-bonding the material sheets, and firing the material sheets.

The material sheet 11A is formed of only a ceramic base and does not include a conductive pattern provided on its surface. The material sheet 11A becomes the ceramic dielectric layer 3 of a portion that defines the thickness-direction first outer layer portion 6b1 or the thickness-direction second outer layer portion 6b2 after firing.

The material sheets 11E1 and 11E2 each include conductive patterns 13a and 13b having predetermined shapes on a surface of a ceramic base 12. The conductive pattern 13a is a conductive pattern of a portion that is included primarily in the width-direction center portion region 9c after firing, and is strip-shaped or substantially strip shaped so as to extend in the length direction L in the center portion in the width direction W. The conductive pattern 13b is a conductive pattern of a portion that is included primarily in the width-direction first end portion region 9d1 and the width-direction second end portion region 9d2 after firing, and is strip-shaped substantially strip shaped so as to extend in the length direction L at both end portions in the width direction W. Also, the ceramic base 12 of each of the material sheets 11E1 and 11E2 becomes the ceramic dielectric layer 3 of a portion that defines the thickness-direction inner layer portion 6a or the thickness-direction second outer layer portion 6b2 after firing.

Similarly to the first preferred embodiment, the above-described conductive patterns 13a and 13b are preferably configured to have different thicknesses by adjusting the amount of conductor paste to be applied to the ceramic bases 12. Accordingly, the conductor density in the width-direction first end portion region 9d1 and the conductor density in the width-direction second end portion region 9d2 are lower than the conductor density in the width-direction center portion region 9c during firing.

As described above, in the monolithic ceramic capacitor 1D according to this preferred embodiment, since the conductor density in the width-direction first end portion region 9d1 and the conductor density in the width-direction second end portion region 9d2 are lower than the conductor density in the width-direction center portion region 9c, the capacity of the monolithic ceramic capacitor is increased while the occurrence of delamination is effectively reduced. Accordingly, the reliability of the product is increased, and the yield of the manufacturing process is prevented from being decreased.

Fourth Preferred Embodiment

FIG. 16 is an exploded view showing a multilayer structure of an element body included in a monolithic ceramic capacitor according to a fourth preferred embodiment of the present invention. Next, a configuration of a monolithic ceramic capacitor 1E according to this preferred embodiment is described with reference to FIG. 16.

As shown in FIG. 16, the monolithic ceramic capacitor 1E according to this preferred embodiment is a combination of the characteristic configurations described in the second and third preferred embodiments.

That is, the monolithic ceramic capacitor 1E according to this preferred embodiment is configured such that the conductor density in the length-direction first end portion region 9b1 located at the first end surface 2b1 side in the multilayer portion 9 and the conductor density in the length-direction second end portion region 9b2 located at the second end surface 2b2 side in the multilayer portion 9 are both preferably lower than the conductor density in the residual region in the multilayer portion 9, that is, the length-direction center portion region 9a located at the center in the length direction L in the multilayer portion 9; and the conductor density in the width-direction first end portion region 9d1 located at the first side surface 2c1 side in the multilayer portion 9 and the conductor density in the width-direction second end portion region 9d2 located at the second side surface 2c2 side in the multilayer portion 9 are both preferably lower than the conductor density in the residual portion in the multilayer portion 9, that is, the width-direction center portion region 9c located at the center in the width direction W in the multilayer portion 9.

The monolithic ceramic capacitor 1E with this configuration preferably is provided by including a multilayer structure of material sheets as shown in FIG. 16.

As shown in FIG. 16, the element body 2 is manufactured preferably using a material sheet group 10E as a material including a plurality of material sheets 11A, 11F1, and 11F2 with different configurations. More specifically, the element body 2 is manufactured by stacking the plurality of material sheets 11A, 11F1, and 11F2 with the different configurations in a predetermined order, press-bonding the material sheets, and firing the material sheets.

The material sheet 11A preferably includes only a ceramic base 12 and does not include a conductive pattern on its surface. The material sheet 11A becomes the ceramic dielectric layer 3 of a portion that defines the thickness-direction first outer layer portion 6$b$1 or the thickness-direction second outer layer portion 6$b$2 after firing.

The material sheets 11F1 and 11F2 each include conductive patterns 13$a$ and 13$b$ having predetermined shapes on a surface of a ceramic base 12. The conductive pattern 13$a$ with the large thickness becomes the above-described portion of the inner electrode layer 4 with the relatively high conductor density, and is strip-shaped or substantially strip shaped so as to extend in the length direction L. Also, the conductive pattern 13$b$ with the small thickness becomes the above-described portion of the inner electrode layer 4 with the relatively low conductor density, and is provided to surround one end portion in the length direction L and both end portions in the width direction W of the conductive pattern 13$a$. Also, the ceramic base 12 of each of the material sheets 11F1 and 11F2 becomes the ceramic dielectric layer 3 of the portion that defines the thickness-direction inner layer portion 6$a$ or the thickness-direction second outer layer portion 6$b$2 after firing.

With this configuration, in the monolithic ceramic capacitor 1E according to this preferred embodiment, the capacity of the monolithic ceramic capacitor is increased while the occurrence of delamination, which starts at the surface of the multilayer portion 9 located in the length direction L and the width direction W, is effectively reduced. Accordingly, the reliability of the product is increased, and the yield of the manufacturing process is effectively prevented from being decreased.

Fifth Preferred Embodiment

FIG. 17 is an exploded view showing a multilayer structure of an element body included in a monolithic ceramic capacitor according to a fifth preferred embodiment of the present invention. Next, a configuration of a monolithic ceramic capacitor 1F according to this preferred embodiment is described with reference to FIG. 17.

As shown in FIG. 17, the monolithic ceramic capacitor 1F according to this preferred embodiment is a combination of the characteristic configurations described in the aforementioned first and fourth preferred embodiments.

That is, the monolithic ceramic capacitor 1F according to this preferred embodiment is configured such that the conductor densities of the first outermost layer 4$a$ and the second outermost layer 4$b$ are lower than the conductor density of any inner electrode layer 4 located between the first outermost layer 4$a$ and the second outermost layer 4$b$; the conductor density in the length-direction first end portion region 9$b$1 located at the first end surface 2$b$1 side in the multilayer portion 9 and the conductor density in the length-direction second end portion region 9$b$2 located at the second end surface 2$b$2 side in the multilayer portion 9 are lower than the conductor density in the residual region in the multilayer portion 9, that is, the length-direction center portion region 9$a$ located at the center in the length direction L in the multilayer portion 9; and the conductor density in the width-direction first end portion region 9$d$1 located at the first side surface 2$c$1 side in the multilayer portion 9 and the conductor density in the width-direction second end portion region 9$d$2 located at the second side surface 2$c$2 side in the multilayer portion 9 are lower than the conductor density in the residual region in the multilayer portion 9, that is, the width-direction center portion region 9$c$ located at the center in the width direction W in the multilayer portion 9.

The monolithic ceramic capacitor 1F with this configuration preferably includes a multilayer structure of material sheets as shown in FIG. 17.

As shown in FIG. 17, the element body 2 is manufactured preferably using a material sheet group 10F as a material including a plurality of material sheets 11A, 11C1, 11C2, 11F1, and 11F2 with different configurations. More specifically, the element body 2 is manufactured by stacking the plurality of material sheets 11A, 11C1, 11C2, 11F1, and 11F2 with the different configurations in a predetermined order, press-bonding the material sheets, and firing the material sheets. The configurations of the plurality of material sheets 11A, 11C1, 11C2, 11F1, and 11F2 are described above, and the description is not repeated here.

With this configuration, in the monolithic ceramic capacitor 1F according to this preferred embodiment, the delamination at the surface of the multilayer portion 9 located in the thickness direction T is prevented from occurring, the occurrence of delamination, which starts at the surface of the multilayer portion 9 located in the length direction L and the width direction W, is effectively reduced, and the capacity of the monolithic ceramic capacitor is increased. Accordingly, the reliability of the product is increased, and the yield of the manufacturing process is effectively prevented from being decreased.

In the monolithic ceramic capacitor 1F according to this preferred embodiment, the conductor densities of the first outermost layer 4$a$ and the second outermost layer 4$b$ are preferably lower than the conductor density in the length-direction first end portion region 9$b$1 located at the first end surface 2$b$1 side in the multilayer portion 9, the conductor density in the length-direction second end portion region 9$b$2 located at the second end surface 2$b$2 side in the multilayer portion 9, the conductor density in the width-direction first end portion region 9$d$1 located at the first side surface 2$c$1 side in the multilayer portion 9, and the conductor density in the width-direction second end portion region 9$d$2 located at the second side surface 2$c$2 side in the multilayer portion 9.

This is because separation caused by a difference in contraction ratio between a dielectric layer and a conductor layer during firing more likely occurs at a side at which the thickness-direction first outer layer portion 6$b$1 and the thickness-direction second outer layer portion 6$b$2 are located, as compared to a side at which the length-direction first outer layer portion 7$b$1, the length-direction second outer layer portion 7$b$2, the width-direction first outer layer portion 8$b$1, and the width-direction second outer layer portion 8$b$2 are located, when viewed from the multilayer portion 9. In particular, if the conductor densities of the first outermost layer 4$a$ and the second outermost layer 4$b$ are decreased, the fixing force between the first outermost layer 4$a$ and the thickness-direction first outer layer portion 6$b$1 and the fixing force between the second outermost layer 4$b$ and the thickness-direction second outer layer portion 6$b$2 are increased. Thus, the effect of the increase in reliability and yield becomes more apparent.

The conductor densities of the first outermost layer 4a and the second outermost layer 4b are preferably lower than the conductor densities in the length-direction first end portion region 9b1, the length-direction second end portion region 9b2, the width-direction first end portion region 9d1, and the width-direction second end portion region 9d2, by about 10%, for example. If the conductor densities of the first outermost layer 4a and the second outermost layer 4b are extremely lowered beyond the above-described preferred range, the situation becomes equal or substantially equal to a situation in which the first outermost layer 4a or the second outermost layer 4b does not exist. Thus, the separation may additionally occur between the inner electrode layer 4 and the dielectric layer located at a position closest to each of the first outermost layer 4a and the second outermost layer 4b.

A result of a verification test is described next, in which a prototype of the monolithic ceramic capacitor 1F according to this preferred embodiment was actually manufactured and it was verified whether or not delamination occurs.

In the verification test, as an example, 20 monolithic ceramic capacitors were manufactured, each of the monolithic ceramic capacitors including an element body having design values of the size of 1.0 mm length, 0.5 mm width, and 0.5 mm thickness. In each monolithic ceramic capacitor according to the example, a design value of the distance between the inner electrode layers (that is, the thickness of the dielectric layer) was 1.0 µm, a design value of the thickness of the inner electrode layer was 1.0 µm, the number of stacked inner electrode layers was 350, a design value of the thickness of the sintered metal layer of the outer electrode was 28 µm, and design values of the thicknesses of the Ni-plated layer and Sn-plated layer of the outer electrode were each 3 µm.

Also, in the monolithic ceramic capacitor according to the example, the gravure printing method was used, and the conductive pattern 13a with a large thickness and the conductive pattern 13b with a small thickness were printed on the ceramic bases 12 according to the layout as shown in FIG. 17. Accordingly, in the monolithic ceramic capacitor according to the example, by executing the firing step, the conductor density of the portion of the inner electrode layer corresponding to the conductive pattern 13b with the small thickness was lower than the conductor density of the portion of the inner electrode layer corresponding to the conductive pattern 13a with the large thickness by about 5% to about 10%.

In contrast, as a comparative example, 20 monolithic ceramic capacitors were manufactured. Each monolithic ceramic capacitor was formed such that the thickness of all conductive patterns was equal or substantially equal to the thickness of the conductive pattern 13a according to the example. The manufacturing condition of the monolithic ceramic capacitor according to the comparative example was the same or substantially the same as the manufacturing condition of the monolithic ceramic capacitor according to the example, except that the aforementioned thicknesses of the conductive patterns were uniformly large. Accordingly, with the monolithic ceramic capacitor according to the comparative example, the inner electrode layer formed in the firing step had an equivalent conductor density in the entire region.

In the monolithic ceramic capacitor according to the example (that is, in the monolithic ceramic capacitor designed such that the conductor density at an outer edge portion of the multilayer body was partly low), the occurrence of delamination was not observed in any of the manufactured 20 monolithic ceramic capacitors, and in the monolithic ceramic capacitor according to the comparative example (that is, in the monolithic ceramic capacitor designed such that the conductor density was uniform in the entire region of the multilayer body), the delamination occurred in one of the 20 manufactured monolithic ceramic capacitors.

The conductor densities were measured by a process according to the process described in the aforementioned first to third preferred embodiments for all monolithic ceramic capacitors according to the example and all monolithic ceramic capacitors according to the comparative example. As the result, it was ensured that the conductor densities of the respective portions were designed values.

As is clear from this result, by using the monolithic ceramic capacitors according to the example, the effective reduction in occurrence of delamination was experimentally ensured.

In the preferred embodiments of the present invention described above, the combination of the characteristic configurations described in the aforementioned second and third preferred embodiments has been exemplarily described as the fourth preferred embodiment, and the combination of the characteristic configurations described in the aforementioned first to third preferred embodiments has been exemplarily described as the fifth preferred embodiment. However, a combination of other residual characteristic configurations including the characteristic configuration described in the modification based on the above-described first preferred embodiment may also be used.

The above-described preferred embodiments and modification currently disclosed are merely examples, and are not intended to be limited. The technical scope of the present invention is defined by the claims and includes meaning equivalent to the description of the claims and all modifications within the scope.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A monolithic ceramic capacitor comprising:
an element body including a multilayer portion including a plurality of conductor layers and a plurality of ceramic dielectric layers alternately stacked in a thickness direction of the element body; and
an outer electrode provided on an outer portion of the element body; wherein
outer surfaces of the element body include a first principal surface and a second principal surface that are opposed to each other in the thickness direction, a first end surface and a second end surface that are opposed to each other in a length direction perpendicular or substantially perpendicular to the thickness direction, and a first side surface and a second side surface that are opposed to each other in a width direction perpendicular or substantially perpendicular to both the thickness direction and the length direction;
the element body is divided in the thickness direction into a thickness-direction first outer layer portion that includes a first ceramic dielectric layer and defines the first principal surface, a thickness-direction second outer layer portion that includes a second ceramic dielectric layer and defines the second principal surface, and a thickness-direction inner layer portion including the multilayer portion and located between the thickness-direction first outer layer portion and the thickness-direction second outer layer portion;

among the plurality of conductor layers included in the thickness-direction inner layer portion, a first conductor layer including only one conductor layer arranged at a position closest to the first principal surface is provided at a position adjacent to the first ceramic dielectric layer of the thickness-direction first outer layer portion;

among the plurality of conductor layers included in the thickness-direction inner layer portion, a second conductor layer including only one conductor layer arranged at a position closest to the second principal surface is provided at a position adjacent to the second ceramic dielectric layer of the thickness-direction second outer layer portion;

the outer electrode includes a first outer electrode provided to cover the first end surface, and a second outer electrode provided to cover the second end surface;

one portion of the plurality of conductor layers is connected to the first outer electrode through a first wiring portion extending from the multilayer portion toward the first end surface side;

another portion of the plurality of conductor layers is connected to the second outer electrode through a second wiring portion extending from the multilayer portion toward the second end surface side;

the element body is divided in the length direction into a length-direction first outer layer portion that includes portions of the conductor layer and the ceramic dielectric layer corresponding to the first wiring portion and defines the first end surface, a length-direction second outer layer portion that includes portions of the conductor layer and the ceramic dielectric layer corresponding to the second wiring portion and defines the second end surface, and a length-direction inner layer portion that includes the multilayer portion and is located between the length-direction first outer layer portion and the length-direction second outer layer portion;

a conductor density in a length-direction first end portion region located at the first end surface side in the multilayer portion, and a conductor density in a length-direction second end portion region located at the second end surface side in the multilayer portion are lower than a conductor density in a length-direction center portion region located at a center in the length direction in the multilayer portion;

the element body is divided in the width direction into a width-direction first outer layer portion that includes the ceramic dielectric layer and defines the first side surface, a width-direction second outer layer portion that includes the ceramic dielectric layer and defines the second side surface, and a width-direction inner layer portion that includes the multilayer portion and is located between the width-direction first outer layer portion and the width-direction second outer layer portion;

a conductor density in a width-direction first end portion region located at the first side surface side in the multilayer portion, and a conductor density in a width-direction second end portion region located at the second side surface side in the multilayer portion are lower than a conductor density in a width-direction center portion region located at the center in the width direction in the multilayer portion; and the conductor densities of the first conductor layer and the second conductor layer are lower than the conductor densities in the length-direction first end portion region, the length-direction second end portion region, the width-direction first end portion region, and the width-direction second end portion region.

2. The monolithic ceramic capacitor according to claim 1, wherein the first conductor layer and the second conductor layer each include a plurality of fine through holes penetrating through the first conductor layer and the second conductor layer in the thickness direction; and the plurality of through holes are filled with a ceramic dielectric material.

3. The monolithic ceramic capacitor according to claim 1, wherein a portion of the conductor layer connected to the second outer electrode and included in the length-direction first end portion region among the plurality of conductor layers, and a portion of the conductor layer connected with the first outer electrode and included in the length-direction second end portion region among the plurality of conductor layers include a plurality of fine through holes penetrating through the portions of the conductor layers in the thickness direction; and the plurality of through holes are filled with the ceramic dielectric material.

4. The monolithic ceramic capacitor according to claim 1, wherein portions included in the width-direction first end portion region and the width-direction second end portion region among the plurality of conductor layers include a plurality of through holes penetrating through the conductor layers in the thickness direction; and the plurality of through holes are filled with the ceramic dielectric material.

5. The monolithic ceramic capacitor according to claim 1, wherein the first conductor layer and the second conductor layer are floating conductor layers not connected with the outer electrode.

6. The monolithic ceramic capacitor according to claim 1, wherein the element body has a rectangular or substantially rectangular parallelepiped shape.

7. The monolithic ceramic capacitor according to claim 1, wherein the plurality of ceramic dielectric layers include barium titanate.

8. The monolithic ceramic capacitor according to claim 7, wherein the plurality of ceramic dielectric layers further include at least one of a Mn compound, a Mg compound, a Si compound, a Co compound, a Ni compound, and a rare-earth compound.

9. The monolithic ceramic capacitor according to claim 1, wherein the plurality of conductor layers are made of Ni or Cu.

10. The monolithic ceramic capacitor according to claim 1, wherein the outer electrode is defined by a multilayer film.

11. The monolithic ceramic capacitor according to claim 10, wherein the multilayer film includes a sintered metal layer disposed on the outer portion of the element body and a plated layer disposed on the sintered metal layer.

12. The monolithic ceramic capacitor according to claim 11, wherein the sintered metal layer is made of a sintered conductor paste including at least one of Cu, Ni, Ag, Pd, an Ag—Pd alloy, and Au.

13. The monolithic ceramic capacitor according to claim 11, wherein the plated layer is one of a Cu plated layer and an Au plated layer.

14. The monolithic ceramic capacitor according to claim 1, wherein a thickness of the first conductor layer and the second conductor layer is smaller than a thickness of the other conductor layer located between the first and second conductor layers.

15. The monolithic ceramic capacitor according to claim 1, wherein edge portions and corner portions of the element body are rounded.

* * * * *